US009375627B2

(12) United States Patent
Hansen

(10) Patent No.: US 9,375,627 B2
(45) Date of Patent: Jun. 28, 2016

(54) LASER DETECTION ENHANCED RFID TAG READING EVENT TIMING SYSTEM AND METHOD

(75) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 131 days.

(21) Appl. No.: 13/980,539

(22) PCT Filed: Jan. 20, 2012

(86) PCT No.: PCT/US2012/022125
§ 371 (c)(1),
(2), (4) Date: Jul. 18, 2013

(87) PCT Pub. No.: WO2012/100231
PCT Pub. Date: Jul. 26, 2012

(65) Prior Publication Data
US 2013/0300542 A1    Nov. 14, 2013

Related U.S. Application Data

(60) Provisional application No. 61/434,769, filed on Jan. 20, 2011.

(51) Int. Cl.
G07C 1/24 (2006.01)
A63B 71/06 (2006.01)
(Continued)

(52) U.S. Cl.
CPC ............ *A63B 71/06* (2013.01); *G06K 7/10425* (2013.01); *G07C 1/24* (2013.01); *H04N 7/188* (2013.01)

(58) Field of Classification Search
CPC ............ G07C 1/22; G07C 1/24; A63B 71/06; G06K 7/10425; H04N 7/188; G01S 17/026; G01S 17/10
USPC .......................................................... 368/10
See application file for complete search history.

(56) References Cited

U.S. PATENT DOCUMENTS 4,142,680 A    3/1979 Oswald et al.
4,505,595 A    3/1985 Rose et al.
(Continued)

FOREIGN PATENT DOCUMENTS

EP    2009595 A    12/2008
JP    2003-327331 A    11/2003
(Continued)

OTHER PUBLICATIONS

PCT Search Report, PCT US 2010-022559, Jan. 29, 2010.
(Continued)

*Primary Examiner* — James Yang
*Assistant Examiner* — Laura Nguyen
(74) *Attorney, Agent, or Firm* — Polster Lieder

(57) ABSTRACT

Systems and methods for determining a time of a passing a detection line by a participant having an RFID tag traveling along the route, the system includes a timing system an RFID tag reader system for wirelessly receiving tag reads including a tag identifier for the RFID tags, time stamps each RFID tag read, and transmits them to the timing system, a laser detector detects a laser beam interrupt and generates a laser beam interrupt indicator receives the generated laser beam interrupt indicator, and determines a beam interrupt time, and creates a laser beam interrupt message including the beam interrupt time, the timing system receives the tag read messages and the laser beam interrupt messages, determines the identity of the participant from the tag identifier, associates the laser beam interrupt message with the determined tag identifier, and stores the beam interrupt time as the time of detecting the passing.

20 Claims, 9 Drawing Sheets

(51) Int. Cl.
*G06K 7/10* (2006.01)
*H04N 7/18* (2006.01)

(56) References Cited

U.S. PATENT DOCUMENTS

| | | | |
|---|---|---|---|
| 4,812,845 A | 3/1989 | Yamada et al. | |
| 4,918,630 A | 4/1990 | Plouff et al. | |
| 5,091,895 A | 2/1992 | Chatwin et al. | |
| 5,140,307 A | 8/1992 | Rebetez et al. | |
| 5,241,487 A * | 8/1993 | Bianco | 702/178 |
| 5,436,611 A | 7/1995 | Arlinghaus, Jr. | |
| 5,493,805 A | 2/1996 | Penuela et al. | |
| 5,511,045 A | 4/1996 | Sasaki et al. | |
| 5,604,485 A | 2/1997 | Lauro et al. | |
| 5,696,481 A | 12/1997 | Pejas et al. | |
| 5,812,049 A | 9/1998 | Uzi | |
| 5,821,902 A | 10/1998 | Keen | |
| 5,883,582 A | 3/1999 | Bowers et al. | |
| 5,973,598 A | 10/1999 | Beigel | |
| 6,008,773 A | 12/1999 | Matsuoka et al. | |
| 6,100,804 A | 8/2000 | Brady et al. | |
| 6,204,813 B1 | 3/2001 | Wadell et al. | |
| 6,278,413 B1 | 8/2001 | Hugh et al. | |
| 6,340,932 B1 | 1/2002 | Rodgers et al. | |
| 6,369,697 B1 | 4/2002 | Poole | |
| 6,466,178 B1 | 10/2002 | Muterspaugh | |
| 6,496,806 B1 | 12/2002 | Horwitz et al. | |
| 6,512,478 B1 | 1/2003 | Chien | |
| 6,570,487 B1 | 5/2003 | Steeves | |
| 6,577,238 B1 | 6/2003 | Whitesmith et al. | |
| 6,696,954 B2 | 2/2004 | Chung | |
| 6,703,935 B1 | 3/2004 | Chung et al. | |
| 6,710,713 B1 | 3/2004 | Russo | |
| 6,720,930 B2 | 4/2004 | Johnson et al. | |
| 6,812,824 B1 | 11/2004 | Goldinger et al. | |
| 6,839,027 B2 | 1/2005 | Krumm et al. | |
| 6,888,459 B2 | 5/2005 | Stilp | |
| 6,888,502 B2 | 5/2005 | Beigel et al. | |
| 6,952,157 B1 | 10/2005 | Stewart et al. | |
| 6,963,270 B1 | 11/2005 | Gallagher, III et al. | |
| 6,989,750 B2 | 1/2006 | Shanks et al. | |
| 6,995,655 B2 | 2/2006 | Ertin et al. | |
| 7,009,562 B2 | 3/2006 | Jenabi | |
| 7,019,639 B2 | 3/2006 | Stilp | |
| 7,057,511 B2 | 6/2006 | Shanks et al. | |
| 7,057,975 B2 | 6/2006 | Stobbe | |
| 7,339,478 B2 | 3/2008 | Le | |
| 7,508,739 B2 | 3/2009 | Paes | |
| 7,589,616 B2 | 9/2009 | Klatsmanyi et al. | |
| 7,605,685 B2 | 10/2009 | Stewart et al. | |
| 7,605,689 B2 | 10/2009 | Hein et al. | |
| 8,085,136 B2 | 12/2011 | Stewart et al. | |
| 8,179,233 B2 | 5/2012 | Kia | |
| 2001/0040895 A1 | 11/2001 | Templin | |
| 2002/0008622 A1 | 1/2002 | Weston et al. | |
| 2002/0008624 A1 | 1/2002 | Paek | |
| 2002/0044057 A1 | 4/2002 | Zirbes | |
| 2002/0044096 A1 | 4/2002 | Chung | |
| 2003/0014678 A1 | 1/2003 | Ozcetin et al. | |
| 2003/0073518 A1 | 4/2003 | Marty et al. | |
| 2003/0163287 A1 | 8/2003 | Vock et al. | |
| 2003/0189484 A1 | 10/2003 | Rust et al. | |
| 2004/0006445 A1 | 1/2004 | Paek | |
| 2005/0093976 A1 | 5/2005 | Valleriano et al. | |
| 2005/0099269 A1 | 5/2005 | Diorio et al. | |
| 2006/0097847 A1 | 5/2006 | Bervoets et al. | |
| 2006/0097874 A1 | 5/2006 | Salesky et al. | |
| 2006/0103536 A1 | 5/2006 | Kwak et al. | |
| 2006/0176216 A1 | 8/2006 | Hipskind | |
| 2007/0076528 A1 | 4/2007 | Kirby | |
| 2007/0097969 A1 | 5/2007 | Regnier | |
| 2007/0182567 A1 | 8/2007 | Stewart et al. | |
| 2007/0252770 A1 | 11/2007 | Kai et al. | |
| 2007/0262871 A1 | 11/2007 | Yamagajo et al. | |
| 2007/0272011 A1 | 11/2007 | Chapa, Jr. et al. | |
| 2008/0018479 A1 | 1/2008 | Hashimoto et al. | |
| 2008/0021676 A1 | 1/2008 | Vock et al. | |
| 2008/0111695 A1 | 5/2008 | Yamagajo et al. | |
| 2008/0139263 A1 | 6/2008 | He et al. | |
| 2008/0143620 A1 | 6/2008 | Khatri | |
| 2008/0246615 A1 | 10/2008 | Duron et al. | |
| 2008/0246616 A1 | 10/2008 | Sakama et al. | |
| 2008/0284654 A1 | 11/2008 | Burnside et al. | |
| 2008/0316032 A1 | 12/2008 | Kia | |
| 2009/0015377 A1 | 1/2009 | Fogg et al. | |
| 2009/0184806 A1 | 7/2009 | Kia | |
| 2009/0231198 A1 | 9/2009 | Walsh et al. | |
| 2009/0284368 A1 | 11/2009 | Case, Jr. | |
| 2010/0019897 A1 | 1/2010 | Stewart et al. | |
| 2010/0051701 A1 | 3/2010 | Ogata et al. | |
| 2010/0088023 A1 | 4/2010 | Werner | |
| 2010/0271263 A1 | 10/2010 | Moshfeghi | |
| 2010/0295943 A1 | 11/2010 | Cha et al. | |
| 2010/0302910 A1 | 12/2010 | Howell | |
| 2011/0054792 A1 | 3/2011 | McClellan | |
| 2011/0141221 A1 | 6/2011 | Satterlee et al. | |
| 2011/0298583 A1 | 12/2011 | Libby et al. | |
| 2012/0082007 A1 * | 4/2012 | Duxbury | 368/10 |
| 2012/0115557 A1 | 5/2012 | Kia | |
| 2012/0230240 A1 | 9/2012 | Nebat et al. | |
| 2014/0052279 A1 | 2/2014 | Van Rens | |

FOREIGN PATENT DOCUMENTS

| | | |
|---|---|---|
| JP | 2006-004065 A | 1/2006 |
| JP | 2006-053655 A | 2/2006 |
| JP | 2008-276353 A | 11/2006 |
| JP | 2008-299535 A | 12/2008 |
| JP | 4394600 A | 10/2009 |
| JP | 2010-088886 A | 4/2010 |
| JP | 2010-202998 A | 9/2010 |
| JP | 2011-002958 A | 1/2011 |
| KR | 10-2002-0008234 A | 1/2002 |
| KR | 10-2002-0065429 A | 8/2002 |
| KR | 10-0438359 B1 | 7/2004 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |
| KR | 10-2010-0119271 A | 11/2010 |

OTHER PUBLICATIONS

PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.127; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.

(56) References Cited

OTHER PUBLICATIONS

DAG System—Badgeur V2 Sport Version Datasheet; Pygma Lyon (DAG), Jul. 19, 2004.
Annex 1: Utilization of the Dag Badger System; Pygma Lyon (DAG).
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 29, 2011.
PCT Search Report, PCT US 2011-050570, Sep. 6, 2011.
PCT Search Report, PCT US 2012-022156, Jan. 23, 2012.
PCT Search Report, PCT US 2012-022126, Jan. 20, 2012.
PCT Search Report, PCT US 2012-022125, Jan. 20, 2012.
PCT Search Report, PCT US 2012-022132, Sep. 14, 2012.

* cited by examiner

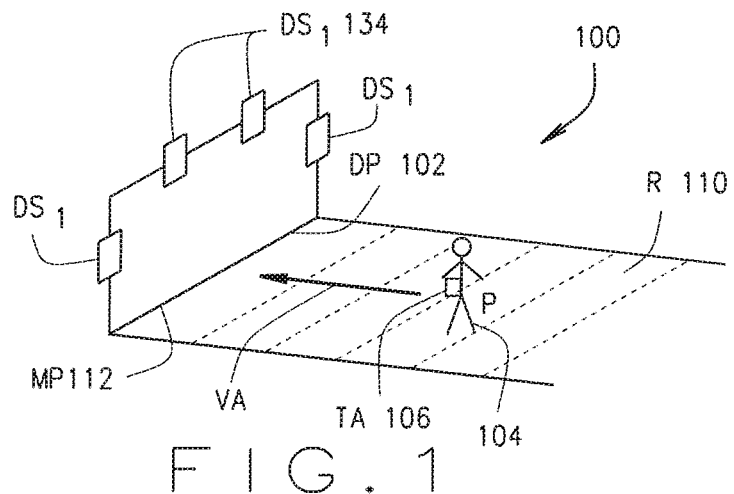
F I G . 1
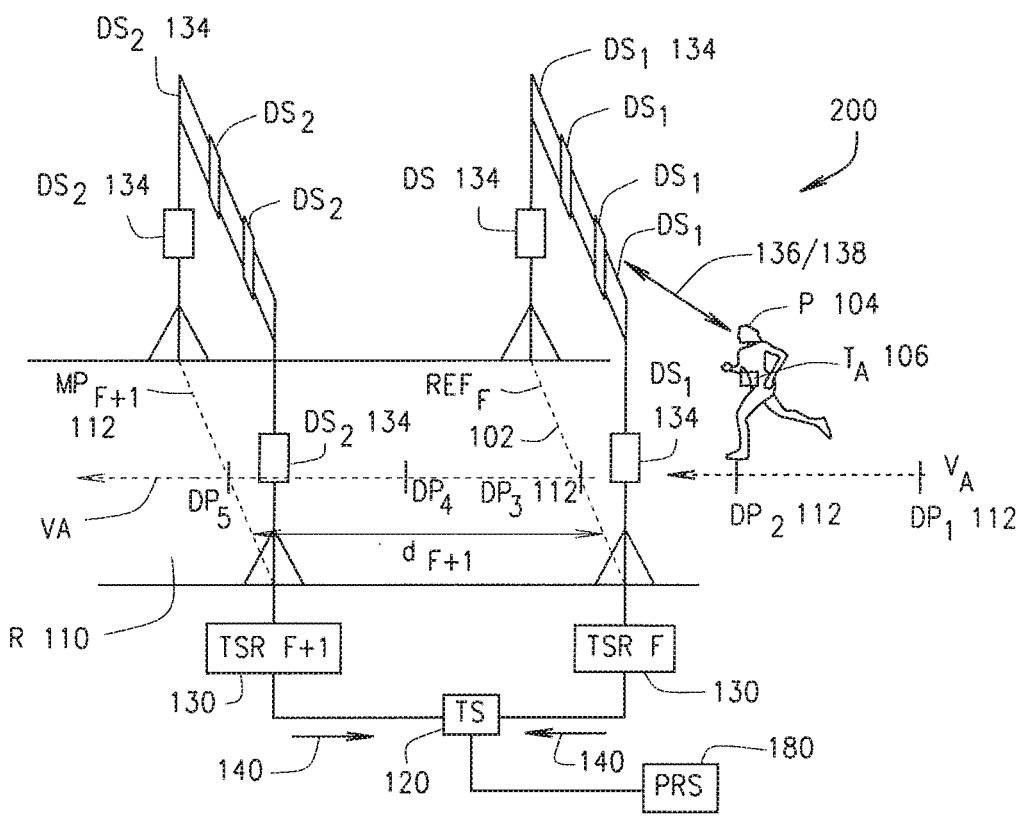
F I G . 2

LASER DETECTION ENHANCED RFID TAG READING EVENT TIMING SYSTEM AND METHOD

CROSS-REFERENCE TO RELATED APPLICATIONS

This application is a National Stage of International Application No. PCT/US12/22125, filed Jan. 20, 2012, which claimed the benefit of U.S. Provisional Application No. 61/434,769, filed on Jan. 20, 2011 and was entitled SYSTEMS AND METHODS FOR IMAGE CAPTURE INTEGRATION AND DETECTION POINT LASER DETECTION IN AN EVENT TIMING SYSTEM, the disclosures of which is incorporated herein by reference.

FIELD

The present disclosure relates to timing systems and, more specifically, to a timing systems for detecting a timed passing of a participant or object at a detection point.

BACKGROUND

The statements in this section merely provide background information related to the present disclosure and may not constitute prior art.

RFID tag reading timing systems have been used to identify an event participant and to determine the passing of such participant by a timing point or timed detection point. Such systems use RFID tags that are positioned on the participant or an object associated with the participant. When theses RFID tags come within range of an RFID tag reader, the RFID tag reader obtains the tag's number, and timestamps the reading of that tag number. The RFID tag read timestamps are associated with the tag number. With RFID tag readers being located at the start, waypoints, and finish lines of the event, a total time for the participant is calculated and reported as the participant's event time. However, in many instances, the RFID tag reads by the RFID tag readers are not as accurate as is often desirable. RFID tag readers cannot defined a particular and constant location for each and every tag read, and as such, timing systems often record times for different tag reads for different participants that are essentially based on different locations, and not well defined singular detection point or line. Further, RFID tags are often read multiple times as the participant approaches a timing point with an RFID tag reader. The RFID tags can be hidden, or not placed where the RFID tag reader can make an accurate read. In some events there are numerous participants at a particular location and it is often difficult to accurately determine the time for each participant based on the RFID tag reads. As such, while RFID tag reading technology provides generally good results in identifying the time of the passing of an RFID tag and its participant by a detection location, improved accuracy is desirable.

While visual, infrared or laser detectors have been used to identify the presence or passing of an object or person past a point, such systems do not provide for the ability to uniquely identify the object or person detected by such detection systems.

As such, there is a need for an improved accurate timing system that can uniquely identify each and every participant, but that can provide improved accuracy of a participant passing a particular highly defined detection point or line. The inventor hereof has solved that need.

SUMMARY

The inventor hereof has succeeded at designing systems and methods for integrating a laser or optical participant detection system that can detect the passing of an object or person with a very high degree of accuracy with an RFID tag reader system that provides for the unique detection and identification of each and every participant passing the detection line, even though there may be multiples such passing in a very short interval of time. As will be described, the present system improves upon current RFID tag reader based timing systems by enhancing the identification in time of a participant passing a very fine and highly accurate detection point. The system as described herein provides for an improved accuracy timing system.

In one aspect, a system is provided for determining a time of a passing a detection line on a route by a participant having an RFID tag on the participant or an object associated with the participant, traveling along the route. The system includes a timing system has a processor, a memory, a clock, and a data interface. A RFID tag reader system has a processor, a memory, a clock, and a communication interface for communicating with the timing system. The RFID tag reader also has a radio frequency transceiver for wirelessly communicating with the RFID tag and one or more antenna coupled to the radio frequency transceiver positionable proximate to the detection line for communicating with RFID tags at one or more monitored points passed by the participant as the participant approaches the detection line. The tag reader system is configured for transmitting a tag read request and receiving one or more tag reads including a tag identifier for the RFID tag when the RFID tag is proximate to one of the monitored points. The tag reader system time stamps each of the RFID tag reads and transmits over the communication interface to the timing system a tag read message including the tag identifier and at least a portion of the time stamped RFID tag reads. The system also includes a laser detector has a laser beam generator projecting a laser beam across the detection line, the laser detector generating a laser beam interrupt indicator when detecting an interruption of the projected laser beam at the detection line. A laser detection system has a processor, a memory, a clock, a communication interface for communicating with the timing system. The laser detection system also has an interface coupled to the laser detector for receiving the generated laser beam interrupt indicator. The laser detection system is configured for determining a beam interrupt time of when the laser beam was interrupted as provided by the laser beam interrupt indicator and creating a laser beam interrupt message including the beam interrupt time. The laser detection system transmits over the communication interface to the timing system the laser beam interrupt message. The timing system is configured for receiving the tag read message from the RFID tag reader system and the laser beam interrupt message. The timing system determines the identity of the participant from the tag identifier within the tag read message and associates the laser beam interrupt message with the determined tag identifier. It then stores in the timing system memory the beam interrupt time of the laser beam interrupt message as the time of detecting the passing of the participant at the detection line associated with the determined tag identifier.

In another aspect, a system is provided for determining a time of a passing a detection line on a route by two participants each having an RFID tag on the participant or an object associated with each participant, both of which are traveling along the route. The system includes a timing system has a processor, a memory, a clock, and a data interface. A RFID tag reader system has a processor, a memory, a clock, a communication interface for communicating with the timing system, a radio frequency transceiver for wirelessly communicating with the RFID tag, and one or more antenna coupled to the radio frequency transceiver positionable proximate to the detection line for communicating with the RFID tags at one or more monitored points passed by each participant as they approach the detection line, the tag reader system transmitting a tag read request and receiving one or more tag reads including a different tag identifier for each of the RFID tags when the two RFID tags are proximate to one of the monitored points, time stamping each of the RFID tag reads, and transmitting over the communication interface to the timing system a tag read message including the tag identifier and at least a portion of the time stamped RFID tag reads for each of the two RFID tags. A laser detector has a laser beam generator for projecting a laser beam across the detection line and generates a laser beam interrupt indicator when detecting an interruption of the projected laser beam at the detection line. A laser detection system has a processor, a memory, a clock, a communication interface for communicating with the timing system and an interface coupled to the laser detector for receiving the generated laser beam interrupt indicator, the laser detection system determining a beam interrupt time of when the laser beam was interrupted as provided by the laser beam interrupt indicator, and creating a laser beam interrupt message including the beam interrupt time, and transmitting over the communication interface to the timing system the laser beam interrupt message. The timing system receives the tag read messages from the RFID tag reader system and the laser beam interrupt message and determines from the RFID tag reads which of the received RFID tags is the first RFID tag and which is the second RFID tag. The first RFID tag can be determined as the one having the shortest distance between the RFID tag and the detection line. The timing system associates the beam time with the first RFID tag and determines a delta time as the difference between the time stamps of the first and second RFID tag reads. The timing system determines a second beam time for the second RFID tag as the sum of the first beam time and the delta time, and stores in the timing system memory the beam interrupt time of the laser beam interrupt message as the time of detecting the passing at the detection line of the first RFID tag and the associated first tag identifier and storing the determined second beam time in the timing system memory as the time of detecting the passing at the detection line of the second RFID tag and associated second tag identifier.

In yet another aspect, a method is provided for determining a time of a passing a detection line on a route by a participant having an RFID tag on the participant or an object associated with the participant, traveling along the route. The method includes in an RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with RFID tags at one or more monitored points passed by the participant as the participant approaches the detection line, the processes of transmitting a tag read request, receiving one or more tag reads including a tag identifier for the RFID tag when the RFID tag is proximate to one of the monitored points, time stamping each of the RFID tag reads, and transmitting over the communication interface to the timing system a tag read message including the tag identifier and at least a portion of the time stamped RFID tag reads. The method also includes in a laser detector having a laser beam generator, the processes of projecting a laser beam across the detection line and generating a laser beam interrupt indicator when detecting an interruption of the projected laser beam at the detection line. The method further includes in a laser detection system having a processor, a memory, a clock, a communication interface for communicating with the timing system and an interface coupled to the laser detector, the processes of receiving the generated laser beam interrupt indicator, determining a beam interrupt time of when the laser beam was interrupted as provided by the laser beam interrupt indicator, creating a laser beam interrupt message including the beam interrupt time, and transmitting over the communication interface to the timing system the laser beam interrupt message. The method also includes in a timing system having a processor, a memory, a clock, and a data interface, the processes of receiving the tag read message from the RFID tag reader system, receiving the laser beam interrupt message and determining the identity of the participant from the tag identifier within the tag read message. The timing system processes also include associating the laser beam interrupt message with the determined tag identifier, and storing in the timing system memory the beam interrupt time of the laser beam interrupt message as the time of detecting the passing of the participant at the detection line associated with the determined tag identifier.

In still another aspect, a method is provided for determining a time of a passing a detection line on a route by two participants each having an RFID tag on the participant or an object associated with each participant, both of which are traveling along the route. The method includes operations in various system components as described above. The method includes, in a RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with the RFID tags at one or more monitored points passed by each participant as they approach the detection line, the processes of transmitting a tag read request and receiving one or more tag reads including a different tag identifier for each of the RFID tags when the two RFID tags are proximate to one of the monitored points, time stamping each of the RFID tag reads, and transmitting over the communication interface to the timing system a tag read message including the tag identifier and at least a portion of the time stamped RFID tag reads for each of the two RFID tags. The method also includes in a laser detector having a laser beam generator, the processes of projecting a laser beam across the detection line, and generating a laser beam interrupt indicator when detecting an interruption of the projected laser beam at the detection line. The method also includes in a laser detection system having a processor, a memory, a clock, a communication interface for communicating with the timing system and an interface coupled to the laser detector, the processes of receiving the generated laser beam interrupt indicator, determining a beam interrupt time of when the laser beam was interrupted as provided by the laser beam interrupt indicator. The method also includes creating a laser beam interrupt message that includes the beam interrupt time, and transmitting over the communication interface to the timing system the laser beam interrupt message. The method further includes in a timing system having a processor, a memory, a clock, and a data interface, the processes of receiving the tag read messages from the RFID tag reader system and receiving the laser beam interrupt message. The processes of the timing system also include determining from the RFID tag reads which one of the received RFID tags is the first RFID tag and which is the second RFID tag, the first RFID tag being determined as the one having the shortest distance between the RFID tag and the detection line and associating the beam time with the first RFID tag. The timing system processes also include determining a delta time as the difference between the time stamps of the first and second RFID tag reads, and determining a second beam time for the second RFID tag as the sum of the first beam time and the delta time. The processes further include storing in the timing system memory the beam interrupt time of the laser beam interrupt message as the time of detecting the passing at the detection line of the first RFID tag and the associated first tag identifier and storing the determined second beam time in the timing system memory as the time of detecting the passing at the detection line of the second RFID tag and associated second tag identifier.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 1 is a schematic illustration of a typical STS system configuration that is used to read a Race Bib Tag as it passes RFID reader antennas (DS) that are mounted overhead and on the side of an event course. The specific location of the antennas could be changed to include any position that is deemed suitable for receiving the Bib Tag signal from the tag according to one exemplary embodiment.

FIG. 2 is a schematic drawing showing an RFID Timing System using redundant RFID tag reader systems (TRS) each with multiple RFID tag reader detection systems (DS) according to one exemplary embodiment, according to a first exemplary embodiment.

It should be understood that throughout the drawings, corresponding reference numerals indicate like or corresponding parts and features.

DETAILED DESCRIPTION

Figure 3:
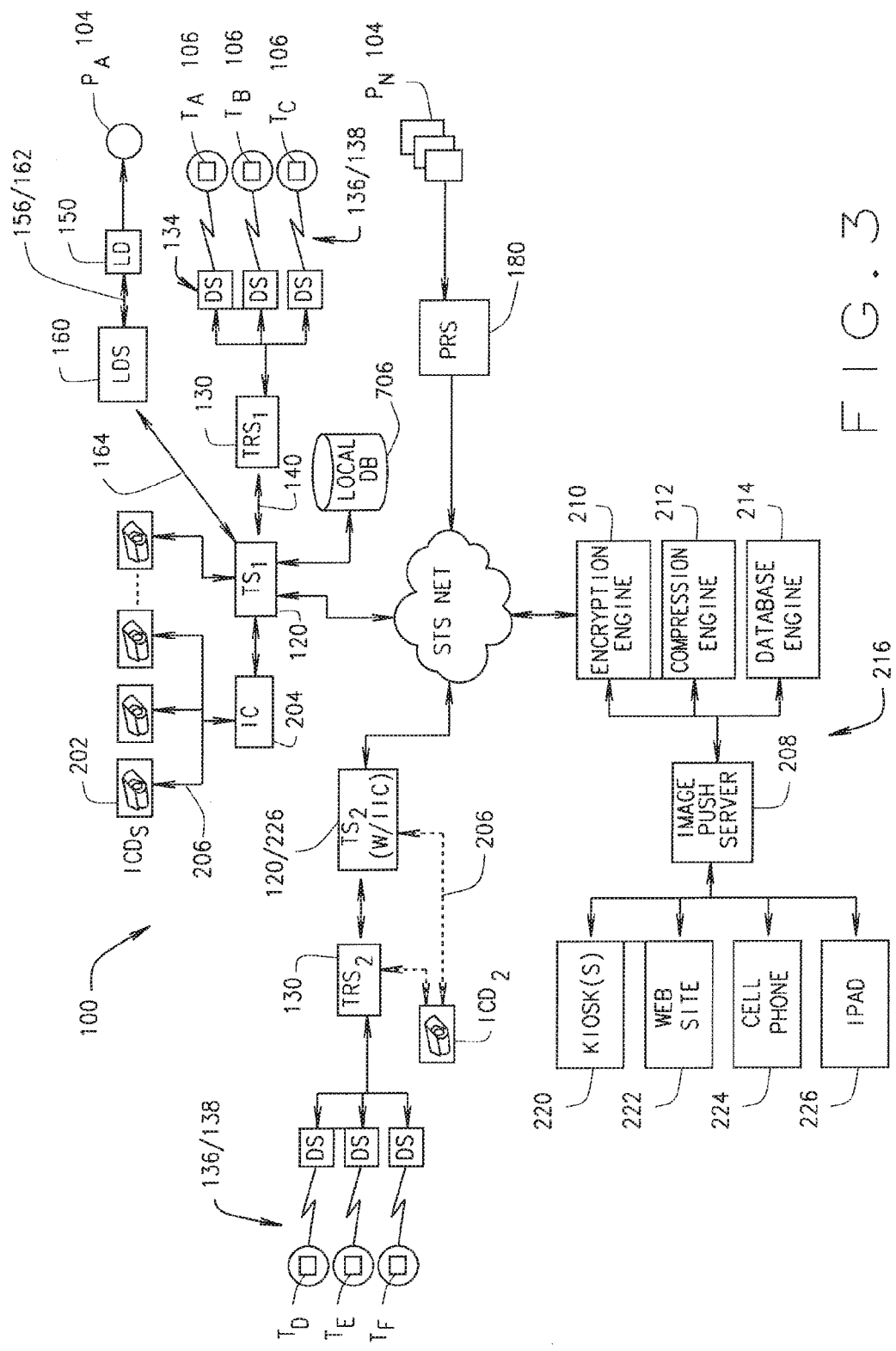
FIG. 3 is a block diagram showing the system architecture of a timing system (STS) with integrated RFID tag read triggering and/or laser detection triggering for capturing and associating a photograph or video according to one exemplary embodiment.

The following description is merely exemplary in nature and is not intended to limit the present disclosure or the disclosure's applications or uses.

In some embodiments, as shown in the various drawings, a system 100 is provided for determining a time of a passing a detection line 102 on a route 100 by a participant 104 having an RFID tag 106 on the participant or an object associated with the participant 104, traveling along the route 110. The timing system 120 has a processor 704, a memory 706, a clock 122, and a data interface 724, 726. The system 100 also includes a RFID tag reader system 130 having a processor 704, a memory 7-6, a clock 122, a communication interface 724, 726 for communicating with the timing system 120. The RFID tag reader 130 also has a radio frequency transceiver for wirelessly communicating with one or more RFID tags 106 via one or more antenna 134 coupled to the radio frequency transceiver. Each antenna 134 may be positionable proximate to the detection line 102 such as before or after such detection line 102, so that the antenna 134 can communicate with RFID tags 106 that come within one or more monitored points 112 or locations passed by the participants 104 or as a participant approaches the detection line 102. The tag reader system 130 is configured using hardware, firmware and/or software such as computer executable instructions for transmitting a tag read request 136 and receiving one or more tag reads 138 including a tag identifier 108 for the RFID tag 106 when the RFID tag 106 is proximate to one of the monitored points 112. The RFID tag reader 130 time stamps each of the RFID tag reads 138 and transmits such tag reads 138 with times over the communication interface 724, 726 to the timing system 120 via a tag read message 140 that includes the tag identifier 108 and at least a portion of the time stamped RFID tag reads 138.

The system 100 also includes one or more laser detectors 150, each having a laser beam generator for projecting a laser beam LB 154 across the detection line 102 or a portion thereof. The laser detector generates a laser beam interrupt indicator 156 when detecting an interruption of the projected laser beam LB 154 at the detection line 102. The laser beams 154 can be any sort of single, dual or multiple laser beam detector 150 and generally includes a reflector or a transmitting and receiving component as is known in the art.

The system 100 further includes a laser detection system 160 having a processor 704, a memory 706, a clock 122, a communication interface 724, 726 for communicating with the timing system 120 and an interface coupled to the laser detector 150 configured for receiving the generated laser beam interrupt indicator 156. The laser detection system 160 is configured for determining a beam interrupt time 162 of when the laser beam LB 154 was interrupted as provided by the laser beam interrupt indicator 156 and creating a laser beam interrupt message 164 including the beam interrupt time 162. The laser detector system 160 is configured to then transmit the laser beam interrupt message 164 over the communication interface 724, 726 to the timing system 120. The timing system 120 is configured for receiving the tag read message 140 from the RFID tag reader system 130 and the laser beam interrupt message 164. After receipt thereof, the timing system 120 is configured to determine the identity of the participant 104 from the tag identifier 108 within one or more of the tag read messages 140 and associating the laser beam interrupt message 164 with the determined tag identifier 108. The timing system 120 then stores in the timing system memory 706 the beam interrupt time 162 of the laser beam interrupt message 164 as the time of detecting the passing of the participant 104 at the detection line 102 associated with the determined tag identifier 108.

In some embodiments, the RFID tag reader system 130 includes a digital I/O port configured for receiving the laser beam interrupt indicator 156 and in such embodiments, the RFID tag reader system 130 can include or otherwise operate as the laser detection system 160 that can be coupled to one or more laser detectors LD 150.

Wherein the timing system 120 is configured for storing each of the received time stamped RFID tag reads 138 and the beam time 162 in the timing system memory 706 in a file associated with the determined tag identifier 108. wherein the stored beam time 162 and RFID tag read times are stored in the timing system memory 706 so that they are uniquely identified as to their origin.

In some embodiments, the system 100 includes two laser detectors 150 each positioned at about the same height but spaced apart from each other on opposing sides but proximate to the detection line 102. In some such embodiments, the two laser detectors 150 are positioned so that their projected laser beams LB 154 are angled relative to the detection line 102, and each generates a separate beam interrupt indicator 156 and the laser detection system 160 determines a separate beam interrupt time 162, calculating a time of passing of the participant 104 based on a comparison of the two separate beam interrupt times 162.

In some embodiments, the RFID tag reader system 130 detects a second (or third or fourth) different RFID tags 106 within the one or more monitored point 112. The second RFID tag 106 is associated with a second participant 104 and having a second tag identifier. The RFID tag reader system 130 receives a plurality of tag reads 138 from each of the first and second RFID tags 106, time stamps each received RFID tag read 138, and transmits a tag read message 140 for each of the first and second tag identifiers 108 with at least a portion of the time stamped RFID tag reads 138 for of the first and second RFID tags 106. In some such embodiments, the timing system 120 determines from the RFID tag reads 138 which one of the received RFID tags 106 is the first RFID tag 106 and which is the second RFID tag 106. Typically the first RFID tag 106 is identified as the one having the shortest distance between the RFID tag 106 and the detection line 102. The timing system 120 associates the beam time 162 with the first RFID tag 106. It also determines a delta time from the difference between the time stamps of the first and second RFID tag reads 138. The timing system 120 then determines a second beam time 162 for the second RFID tag 106 as the sum of the first beam time 162 and the delta time. This determined second beam time 162 is then stored in the timing system memory 706 as the time of detecting the passing of the second participant 104 at the detection line 102.

In some embodiments, the timing system 120 is configured for controlling the laser detection system 160 and the laser detection system 160 is configured to receive controls from the timing system 120 and to control the coupled laser detector 150. As described herein the controlling of the laser detections systems 160 and detectors 150 includes activating and deactivating of the laser beam generator, and the receipt and request of a laser beam interrupt message 164.

In another embodiment, method is provided for determining a time of a passing a detection line on a route by a participant having an RFID tag on the participant or an object associated with the participant, traveling along the route. The method includes in an RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with RFID tags at one or more monitored points passed by the participant as the participant approaches the detection line, the processes of transmitting a tag read request, receiving one or more tag reads including a tag identifier for the RFID tag when the RFID tag is proximate to one of the monitored points, time stamping each of the RFID tag reads, and transmitting over the communication interface to the timing system a tag read message including the tag identifier and at least a portion of the time stamped RFID tag reads. The method also includes in a laser detector having a laser beam generator, the processes of projecting a laser beam across the detection line and generating a laser beam interrupt indicator when detecting an interruption of the projected laser beam at the detection line.

The method further includes in a laser detection system having a processor, a memory, a clock, a communication interface for communicating with the timing system and an interface coupled to the laser detector, the processes of receiving the generated laser beam interrupt indicator, determining a beam interrupt time of when the laser beam was interrupted as provided by the laser beam interrupt indicator, creating a laser beam interrupt message including the beam interrupt time, and transmitting over the communication interface to the timing system the laser beam interrupt message. The method also includes in a timing system having a processor, a memory, a clock, and a data interface, the processes of receiving the tag read message from the RFID tag reader system, receiving the laser beam interrupt message and determining the identity of the participant from the tag identifier within the tag read message. The timing system processes also include associating the laser beam interrupt message with the determined tag identifier, and storing in the timing system memory the beam interrupt time of the laser beam interrupt message as the time of detecting the passing of the participant at the detection line associated with the determined tag identifier.

In another embodiment, a system is provided for determining a time of a passing a detection line on a route by two participants each having an RFID tag on the participant or an object associated with each participant, both of which are traveling along the route. The system includes a timing system having a processor, a memory, a clock, and a data interface. A RFID tag reader system having a processor, a memory, a clock, a communication interface for communicating with a timing system, a radio frequency transceiver for wirelessly communicating with the RFID tag, and one or more antenna coupled to the radio frequency transceiver positionable proximate to the detection line for communicating with the RFID tags at one or more monitored points passed by each participant as they approach the detection line, the tag reader system transmitting a tag read request and receiving one or more tag reads including a different tag identifier for each of the RFID tags when the two RFID tags are proximate to one of the monitored points, time stamping each of the RFID tag reads, and transmitting over the communication interface to the timing system a tag read message including the tag identifier and at least a portion of the time stamped RFID tag reads for each of the two RFID tags.

The system also includes a laser detector having a laser beam generator for projecting a laser beam across the detection line. The laser detection system generates a laser beam interrupt indicator when detecting an interruption of the projected laser beam at the detection line. The laser detection system has a processor, a memory, a clock, a communication interface for communicating with the timing system and an interface coupled to the laser detector for receiving the generated laser beam interrupt indicator. The laser detection system determines a beam interrupt time of when the laser beam was interrupted as provided by the laser beam interrupt indicator and creates a laser beam interrupt message including the beam interrupt time, and transmitting over the communication interface to the timing system the laser beam interrupt message.

The system also includes the timing system that is configured for receiving the tag read messages from the RFID tag reader system and the laser beam interrupt message and determines from the RFID tag reads which one of the received RFID tags is the first RFID tag and which is the second RFID tag. For example, the first RFID tag can be determined as the one having the shortest determined distance between the RFID tag and the detection line. The timing system then associates the beam interrupt time with the first RFID tag. The timing system then determines a delta time as the difference between the time stamps of the first and second RFID tag reads, and delta times for any third or fourth tag read, as compared to the determined first tag read. The timing system then determines for each subsequent RFID tag read, an adjusted time that is a second beam time that is determined as the sum of the first beam time and the associated delta time for such RFID tag. Each of these adjusted times are stored in the timing system memory as the time of detecting the passing at the detection line of the each RFID tag, the first being the actual beam interrupt time, and each other one being the adjusted time based on the associated delta from the RFID tag read comparison. In some embodiments, these laser interrupt time based times are utilized by the timing system in lieu of the RFID tag read times, even though all such RFID tag read times and beam adjusted times may be stored in a datafile for the associated RFID tag.

In yet another embodiment, a method is provided for determining a time of a passing a detection line on a route by two participants each having an RFID tag on the participant or an object associated with each participant, both of which are traveling along the route. The method includes operations in various system components as described above. The method includes, in a RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with the RFID tags at one or more monitored points passed by each participant as they approach the detection line, the processes of transmitting a tag read request and receiving one or more tag reads including a different tag identifier for each of the RFID tags when the two RFID tags are proximate to one of the monitored points, time stamping each of the RFID tag reads, and transmitting over the communication interface to the timing system a tag read message including the tag identifier and at least a portion of the time stamped RFID tag reads for each of the two RFID tags.

The method also includes in a laser detector having a laser beam generator, the processes of projecting a laser beam across the detection line, and generating a laser beam interrupt indicator when detecting an interruption of the projected laser beam at the detection line. The method also includes in a laser detection system having a processor, a memory, a clock, a communication interface for communicating with the timing system and an interface coupled to the laser detector, the processes of receiving the generated laser beam interrupt indicator, determining a beam interrupt time of when the laser beam was interrupted as provided by the laser beam interrupt indicator and creating a laser beam interrupt message including the beam interrupt time, and transmitting over the communication interface to the timing system the laser beam interrupt message.

The method further includes in a timing system having a processor, a memory, a clock, and a data interface, the processes of receiving the tag read messages from the RFID tag reader system and receiving the laser beam interrupt message. The processes of the timing system also include determining from the RFID tag reads which one of the received RFID tags is the first RFID tag and which is the second RFID tag, the first RFID tag being determined as the one having the shortest distance between the RFID tag and the detection line and associating the beam time with the first RFID tag. The timing system processes also include determining a delta time as the difference between the time stamps of the first and second RFID tag reads, and determining a second beam time for the second RFID tag as the sum of the first beam time and the delta time. The processes further include storing in the timing system memory the beam interrupt time of the laser beam interrupt message as the time of detecting the passing at the detection line of the first RFID tag and the associated first tag identifier and storing the determined second beam time in the timing system memory as the time of detecting the passing at the detection line of the second RFID tag and associated second tag identifier.

FIG. 1 is a schematic illustration of a typical STS system 100 configuration that is used to read a Race Bib Tag 106 as it passes RFID reader antennas (DS) 134 that are mounted overhead and on the side of an event course 110. The specific location of the antennas 134 could be changed to include any position that is deemed suitable for receiving the Bib Tag signal from the tag 106 according to one exemplary embodiment. As shown in an exemplary embodiment of FIG. 1, a typical Timing System (TS) 100 for detecting and timing of a participant 106 or object passing a detection point (P) 102 by reading an identification tag (TA) 106 placed on the participant 106 or object (generally referred from hereon as a participant 106, but meaning both a participant of an object) such as an RFID a Race Bib Tag of a participant 106 as the participant 106 passes along route 112 a speed VA past detection sensors (DS1) 134 such as RFID detector antenna 134 are mounted overhead and on the side of a race course 110 proximate to the monitored point MP 112. In some embodiments the DS sensors 134 are mounted under a mat or in a bollard. The specific location of the detection sensors (DS1) 134 could be changed to include any position that is deemed suitable for receiving the Bib Tag signal from the tag 106 according to one exemplary embodiment.

FIG. 2 illustrates another RFID TS 200 having two spaced apart RFID tag reading systems 130 (TSR F and TSR F+1) coupled to a timing system 120, each having a plurality of antenna 134 at different spaced apart monitored points 102 (shown as REF F and MP F+1). In this application, TRSF monitors with RFID antenna DS1 monitored point MPF and TRSF+1 monitors with RFID antenna DS2 monitored point MPF+1 that is space at a distance of DF+1 behind MPF. Also shown are the tag read requests 136 and tag reads 138 from the RFID antenna DS 134 to the RFID TAG 106 and the tag readers 130 sending the tag read message 140 to the timing system 120. Also shown is a Participant Registration System (PRS) 180 coupled to the timing system 120.

FIG. 3 illustrates a timing system architecture having an integrated RFID tag read triggering and/or laser detection triggering for capturing and associating a photograph or video according to one exemplary embodiment. As shown in FIG. 3, in one embodiment a timing system TS 120 has a new image/video interface and capturing capability that enables the integration of image capture devices (ICDs) 202 that are controlled by an Image Controller (IC) 204 or Image Control System (IS) 216 (shown in FIG. 4) for integrating with the timing system TS 120. The interface on timing system TS 120 can be wired, wireless, USB, Ethernet, etc. A timing system TS 120 can support multiple still or video image capture devices ICDs 202 such as cameras connected via various interfaces. For example, in one embodiment, a single STS 100 can receive between 4 and 12 image inputs directly and can support higher numbers such as 200 to 300 (such as 255) cameras 202 connected through remote TS 120 devices using an TS 120 interconnecting protocol. A remote device 226 could be another TS system 120 at a different timing/detection point such as at a different point along a racetrack or an assembly line. For example, a race or assembly line may have 5 timing points/detection points 102 along the course or assembly line. One or more ICDs 202 for videos or photos can be placed at one or more or all of each timing point 102 and all such images 206 can be sent back a single TS system 120 such as one at a finish line or main TS system 120 for displaying on image displays or for transferring via a protocol to a webpage, mobile device or as may be desired by the system operator. If a race, the race operator can display an image 206 of a particular participant 104 so that the participant 104 or interested parties can see images 206 of the participant 104 passing a particular detection point 102, such as the finish line, on a TS announcement display, Kiosk 220, webpage 222, or mobile device 224, 226, after the participant 104 finishes the race. An image push server 208 can provide for pushing the images 206 to the various output devices 220, 222, 224 and 226. The IC 204 or IS 216 can capture single images as well as video streams and it synchronizes the capture images 206 to the RFID tag read 138. As shown, the captured images 206 can be processed through the image system 216 having an encryption engine 210, a compression engine 212 and a database engine 214.

When a RFID tag is read 138, an image 206 is also captured and the two are identified with a common RFID tag number 108. In other words, the TS database 706 has a field that contains a unique identifier 108 that is typically associated with a participant 104 such as a bib or contestant number. The RFID chip reads 138 and any images or video 206 are all commonly associated and in some embodiments, the image 206 is associated with the RFID tag number 108 of the associated RFID chip read 138.

The image or video file itself has a file name that contains a unique numeric entry that identified the image 206. For example, if a race occurs on Jan. 20, 2011 at 11:05:23.014 am in St. Louis, Mo. and the participant identification number 108 (referred herein generally as a bib number) is No. 25, and the number 25 is read by a detection system 134 at a start line 102, a photo 206 can be captured of participant No. 25 P25 and the "captured image file name" (CIFN) for the image 206 would be "photocap-012011-1105014-001-XX-STL." The first part of this file name represents the type of file . . . in this case a captured photo (photocap). In other embodiments, this could be a "videocap" for a captured video 206 or other type. The next 6 digits of the CIFN are the month, day, and year in 2 digit representations. The next set of digits of the CIFN are HH:MM:SS.MMM with the MMM representing milliseconds, for 1,000th of a second timing accuracy, which is the time of the capture or could be the time of the RFID tag read 138. As shown in this example, the CIFN does not include colons such uses "-" as a delimiter. Of course other delimiters are also possible.

The next entry in the CIFN is for the camera position or camera identifier to uniquely identify which image capture device 202 captured the image 206 or video. This is shown as a 3-digit field and in one embodiment can include entries from 000 to 255, or more, or could be for more or less digits.

The next two digits of the CIFN are an indicator for the type of encoding and compression the file is using. Here this is shown as a 2-digit value that can represent up to 99 types of compression or encoding schemes, but other indicators are possible. The final CIFN entry is a variable length string that may contain any identifier for the event/race assigned by the user or STS operator. In this example, the identifier is STL reflecting that it was a St. Louis event.

In addition to static capture of photos and streaming video 206, the herein describe how the timing system TS 120 with the integrated imaging capability enables an event operator, participants, or third parties such as the media or advertisers to such events to subscribe to image/video events and to receive photos or image streams 206 in real time or subsequently. The described timing system TS 120 architecture makes it possible to provide live video feeds to anyone who has need for them. For example, if an event such as a race was being broadcast by a sports television channel, the broadcast company could receive photos or streaming video 206 from the event.

In one exemplary embodiment, a plurality of image capture devices 202 for capturing single images or video 206 (generally referred herein simply as an image 206) with each being associated with a different detection point 102.

The image capture devices 202 are integrated with the participant detection systems (DS) 150 of an STS 120 so that an image 206 is captured in coordination with a detection by a detections system (DS) 150 at its detection point 102. The DS 150 can be an RFID tag reader 150, laser detection system (LDS) 160, or any other system that can detect the presence of a participant 104 or object within the view of the image capture device (ICD) 202, and can include, in some embodiments, the ICD 202 itself.

The captured image 206 is tagged and transmitted to a STS 120 and stored, or at least a link/address/pointer is stored with the detection info or user info. I would assume that each stored image file can also be tagged as well as the user file including the pointer, at least as an option. The image 206 can be stored with a file name that identifies it such that someone could see a list of file names and know which file (image) they wanted to review. Also store a pointer within the user database record that points to the file image. This allows the user to pull up the results for a race participant 104 and also view the images for that person.

Figure 4:
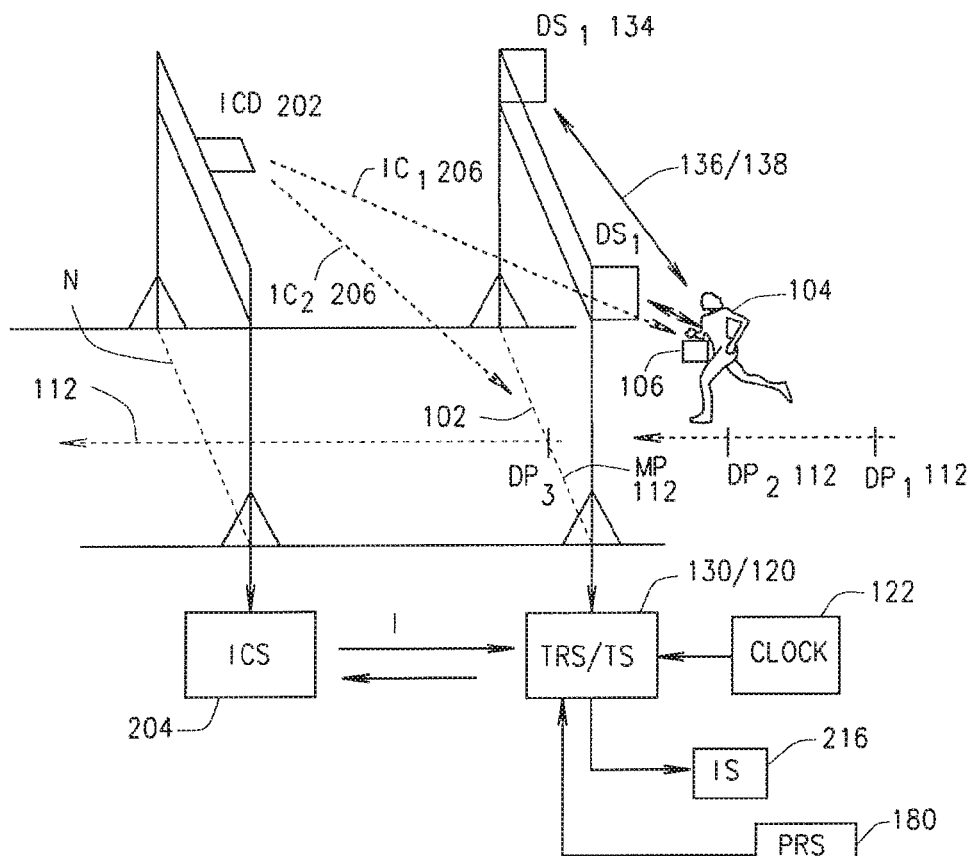
FIG. 4 is schematic illustrating the layout of an event course positioned image capture point having RFID tag readers positioned for triggering the capture and association of a photograph image or video of a passing participant according to one exemplary embodiment.

FIG. 4 illustrates one exemplary on course layout of an event course 112 having image capture devices ICD 202 located behind an RFID tag reader TRS 130 monitored point MP 112. In this illustration, the participant 104 is detected by the RFID tag reader detectors DS1 134 at detection points DP1 112 and then later at DP2 112. The TRS 130 detects the tag 106 and sends an image capture signal to the Image Control System (ICS) 204 that controls the image capture device ICD 202. As shown, a first image capture IC1 206 is taken after the participant 104 is detected by DS1 134 and TRS 130 at DP1 112. A second image capture IC2 206 is taken after the TRS 130 and DS1 134 detect the RFID tag 106 at DP2 112. The ICS 204 transmits the captured images IC1 206 and IC2 206 back to the TRS 130 and/or the timing system TS 120 wherein the images IC1 206 and IC2 206 are associated with the RFID tag numbers 108 of the RFID tag reads 138. As shown in FIG. 4, the timing system TS 120 includes a clock 122 coupled thereto, as well as coupling to an image system 216 and a participant registration system 180.

Figure 5:
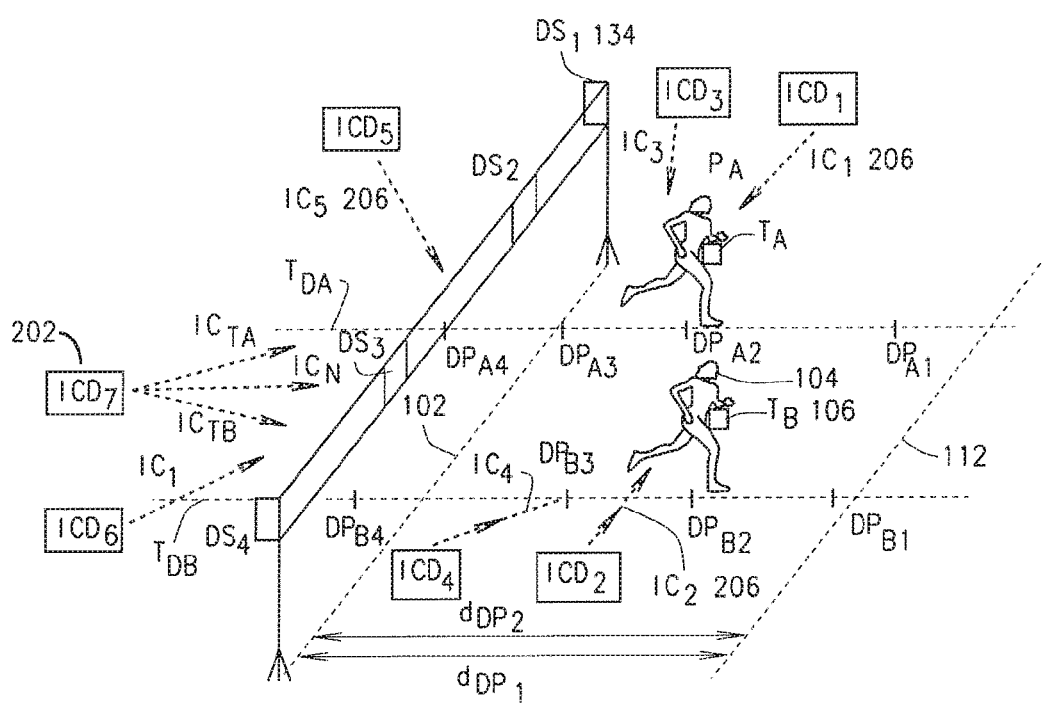
FIG. 5 is schematic illustrating a second layout of a system for an event course positioned at an image capture point having RFID tag readers positioned for triggering the capture and association of a photograph images or videos of two or more passing participants according to one exemplary embodiment.

FIG. 5 illustrates a similar layout as FIG. 4, but having a plurality of image capture devices ICD1 202 taking IC1 206, ICD2 202 taking IC2 206, ICD3 202 taking IC3 206, ICD4 202 taking IC4 206, ICD5 202 taking IC5 206, ICD6 202 taking IC6 206, and ICD7 202 taking IC7 206. Also shown are a plurality of runners Pa 104 and Pb 104, with each having a plurality of RFID tag reader 130 or detection system 134 detection points $DP_{AN}$ 112 and $DP_{BN}$ 112.

Figure 6:
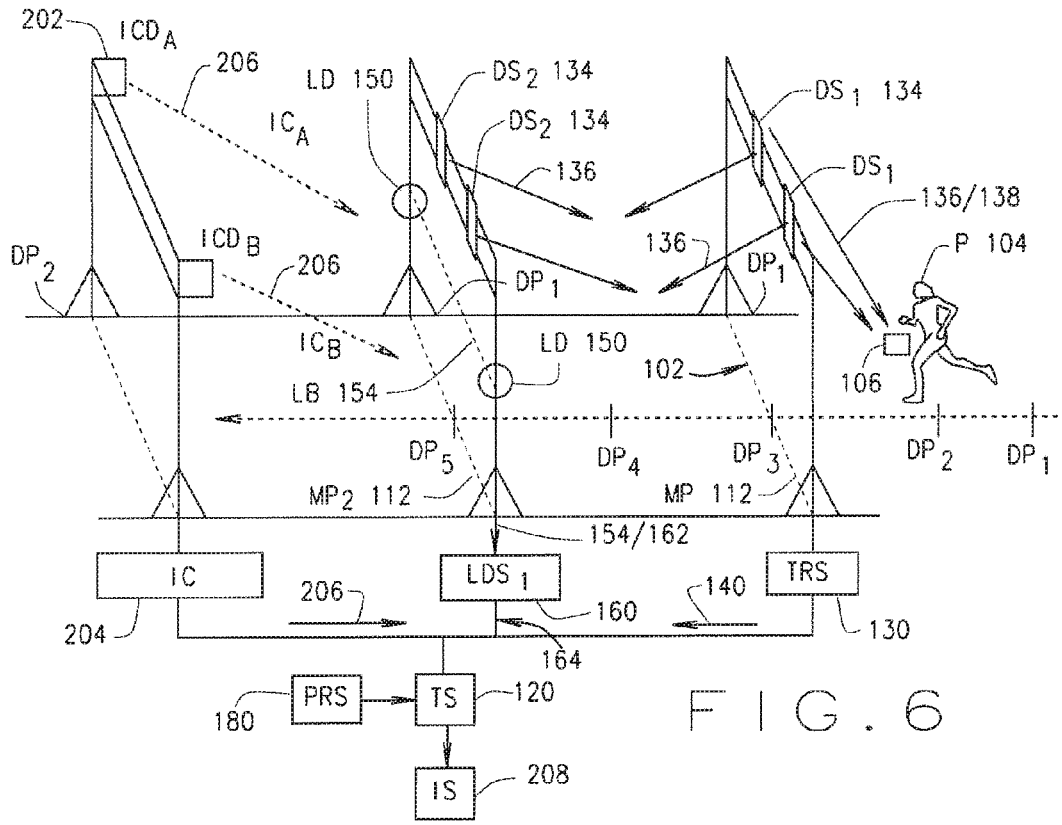
FIG. 6 is schematic illustrating a third layout of a course positioned image capture point having RFID tag readers and a laser detection system, each positioned for triggering the capture and association of a photograph images or videos of passing participants according to one exemplary embodiment.
Figure 7:
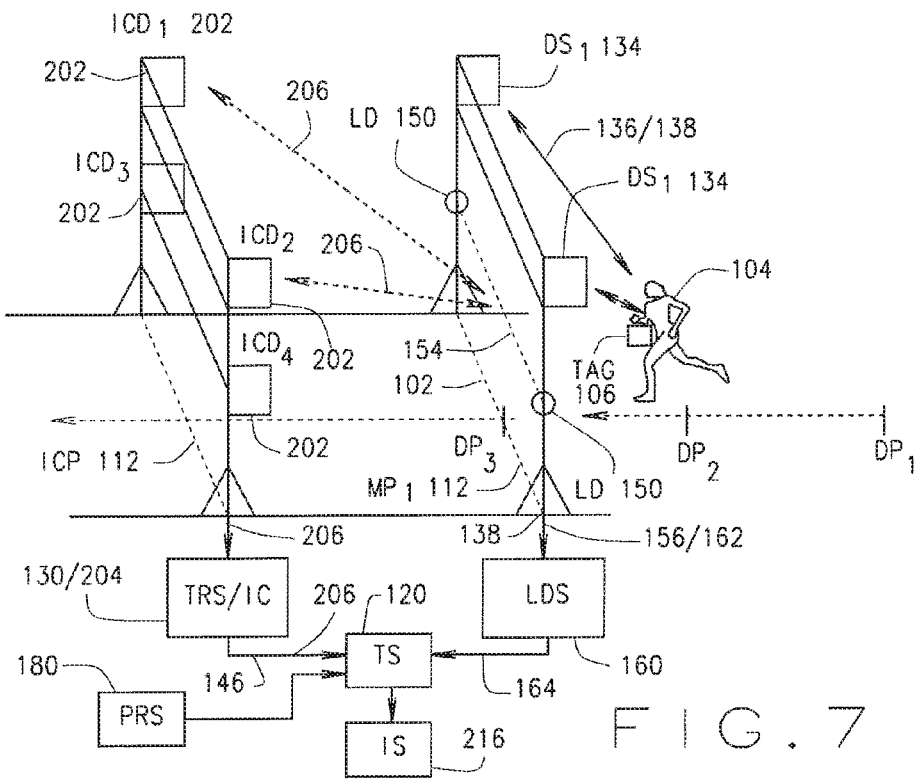
FIG. 7 is schematic illustrating a third layout of a course positioned image capture point having RFID tag readers for participant identification and a laser detection system for triggering the capture and association of a photograph images or videos of passing participants according to one exemplary embodiment.

FIGS. 6 and 7 provide two additional timing system TS 120 layouts each having a different architecture for image capture, but both using, in part, a laser detection system 160 with laser detectors LD 150 with laser beam 154 for aiding in the triggering of the image capture 206, in addition to the RFID tag reads 138 and the TRS 130 or TS 120 identification of the RFID tag numbers 108 associated with each RFID tag 106 and participant 104.

Figure 8:
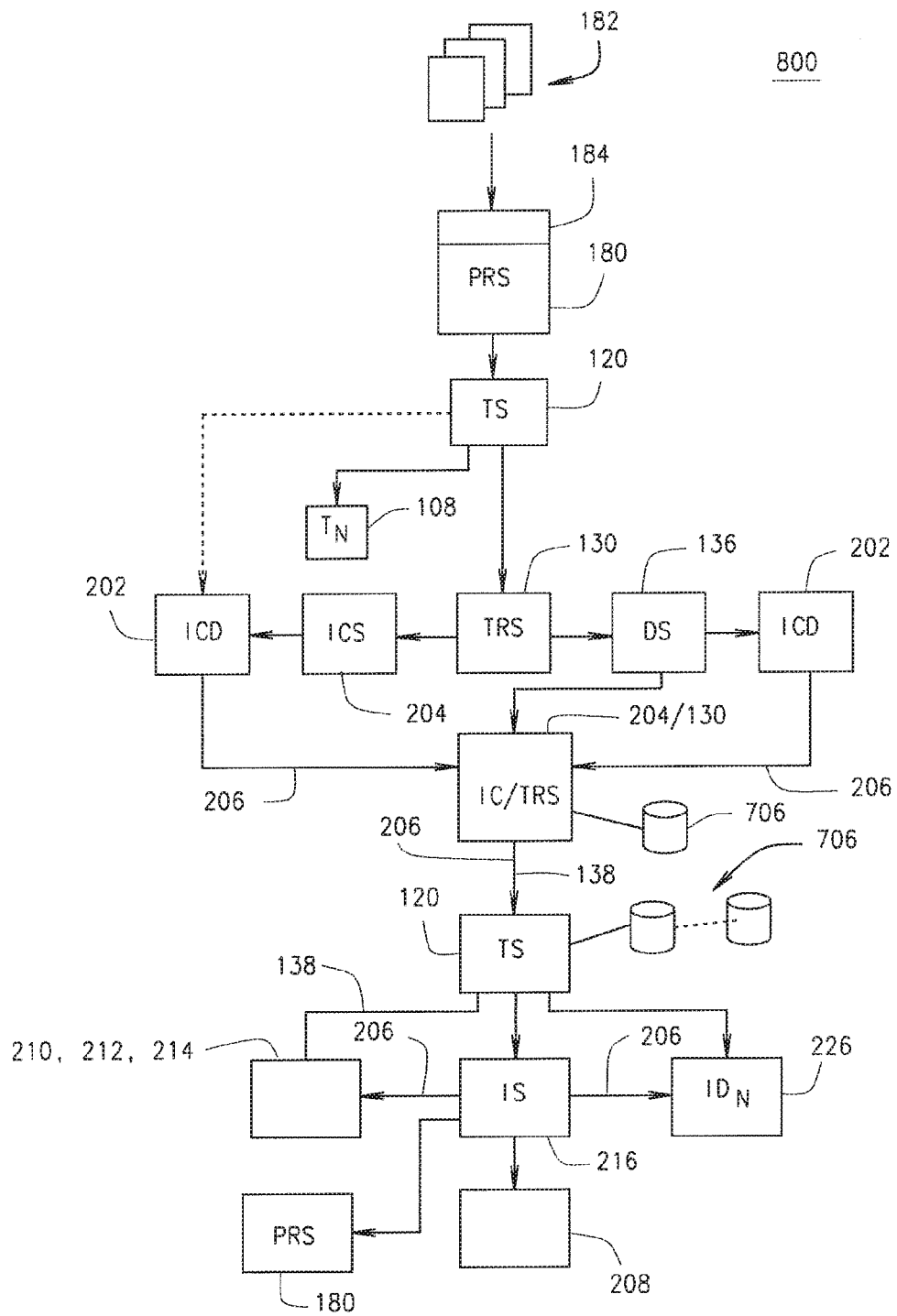
FIG. 8 is a block diagram flow chart illustrating a process for participant preordering of the capture and processing of event photographic images and/or video by a participant in a timed event according to one exemplary embodiment.

FIG. 8 is a block diagram flow chart illustrating a process 800 for participant preordering system PRS 180. As shown, in block PRS 180, one or more requests 182 are received at 184 for preordering of images 206 either still or video. The request 182 can include the identification 108 of the participant 104 for which images 206 are to be taken, the number of images 206, the selection of the location 102 for the images 206 to be taken, and the desired delivery system or method for such image delivery. The delivery can be requested as being during an event or following an event. The delivery sites or locations are shown, by way of example, in FIG. 3 to include a local Kiosk 220, a website 222, a cell phone 224, a tablet 226, or could include a broadcast channel such as a network broadcast station. The PRS 180 provides the request to the TS 120 for the planned capturing, processing and delivery of the preorder images 206 of the particular participant by RFID tag number 106 as provided in the request 182 from the PRS 180. The TS 120 can provide this information to the RFID tag TN 108, to the image capture devices ICD 202, to the TRS 130, or to the image capture system 204. The TRS 130 receives an RFID tag detection read 138 that is the RFID tag number 108 of the request and can trigger the capturing of the image 206 of the particular participant by one or more ICDs 202. Once the ICD 202 takes the requested image or video 206 of the particular pre-identified participant 104 based on the identification by the RFID TRS 130, the captured images 206 and the TRS tag reads 138 with the RFID tag numbers 108 are provided to the TS 120 where they are stored in memory 706 by their RFID tag numbers 108. Subsequently, the TS 120 transmits the stored image data to an imaging system IS 216 or to one or more outputs as described above, or possibly back to the PRS 180.

Figure 9:
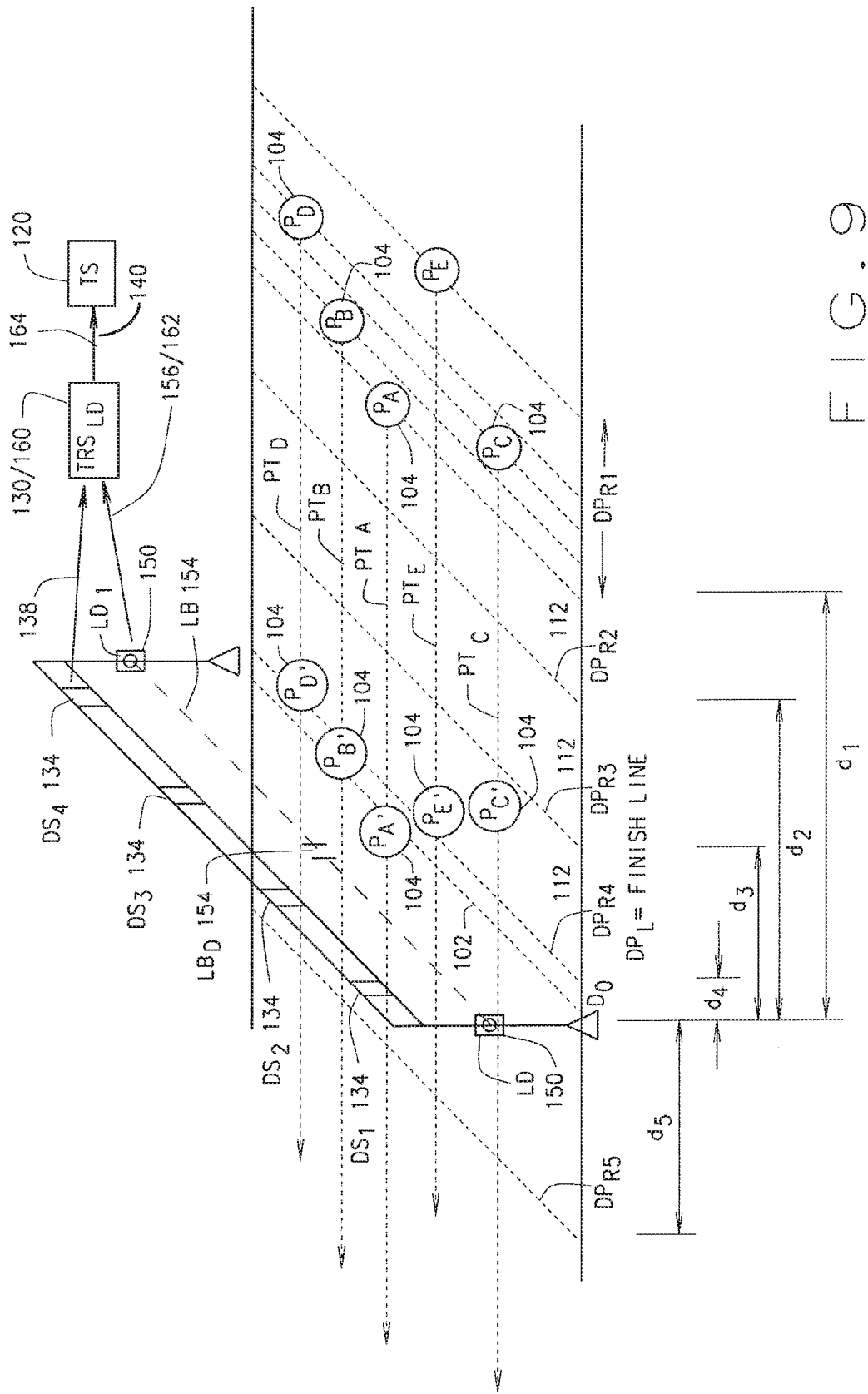
FIG. 9 is a schematic illustration of a TS system using a laser detection system in conjunction with an RFID tag reader for detecting the passing of detecting a plurality of participants passing a detection point in a timed racing event according to one exemplary embodiment.

FIG. 9 illustrates a TS system 100 having a laser detection system 160 in conjunction with an RFID tag reader 130 for detecting the passing of detecting a plurality of participants 104 passing a detection point 102 in a timed racing event according to one exemplary embodiment. As shown, there can be a plurality of participants PN 104 (shown as PA, PB, PC, PD, and PE, each approaching the detection point 102 such as a finish line on course R 110. Each PN 104 travels along a separate path PTN (shown as PTA, PTB, PTC, PTD, and PTD). The detection systems DS1 134, DS2 134, DS3 134, and DS4 134 are RFID tag reading antenna that are coupled to TRS 130 and provide for reading of the RFID tag 106 of each PN 104. The DSN 134 systems first detect the presence of the PN 104 at first detection point DPR1 112. As shown, each PN 104 is spaced apart and at a slightly different distance from the MP 112. As the PNs 104 traverse towards the finish line 102, their positions can change but the DSN 134 continue to read their RFID chips 106, obtain their times and transmit the chip read data 140 to the TS 120 via the TRS 130. As shown each of the PA, PB, PC, PD, and PE 104 have moved to a second detection point DPR2 112, then to a third detection point DPR3 112 and finally, a first PN 104 reaches the detection point DO 112. At this point, PA 104 is shown to be in the lead and breaks the laser beam LB 154 at the detection point DO 102 that is provided by laser detector 150 that is the combination of LD1 150 and LD 150. LD1 150 provides a laser interrupt indicator 156 back to laser detector LD 150, which is shown in FIG. 9 as being combined with the TRS 130. The TRS 130 time stamps the receipt of the laser interrupt indicator 156 the same as it does the RFID tag reads 138. All RFID tag reads 138 and the laser beam interrupt time 162 is sent to the TS 120.

Figure 10:
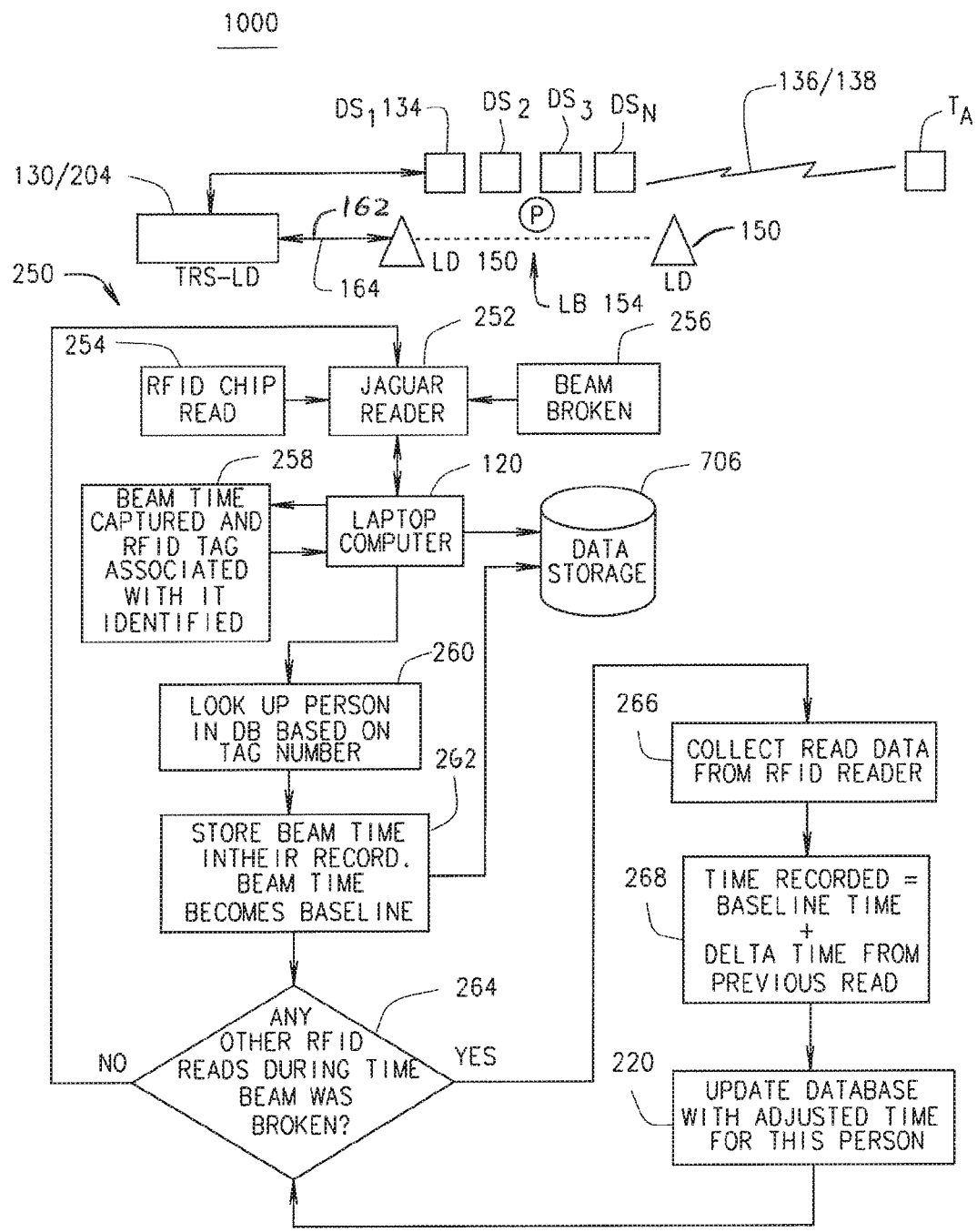
FIG. 10 is a flow chart and illustration for a timing system using a laser detection system in conjunction with an RFID tag reader for detecting an improved accurate time of passing of one or more participants in a timed racing event according to one exemplary embodiment.

Now, as shown in FIG. 10, the timing system 100, after having receiving the multiple tag reads 138 from the multiple RFID tags 106 from each of the participants 104, as well as a laser beam interrupt time 162 via message 164, determines the participants time for passing the detection point 102, e.g., the finish line based on the laser beam interrupt time 162 establishing a highly accurate passing of the first PA 104 at the detection point 102. The process 1000 shown in FIG. 10 describes one embodiment for determining the time of each PN 104 during a single laser interrupt event. Of course the laser detectors 150 reset themselves after the all of the PNs 104 pass, and the process of FIG. 10 is repeated for each laser beam interrupt 156. As shown in process 1000, the tag reader starts the process in 252 when in process 254 the RFID chip is read, and the laser beam is broken in process 256. This information is sent to the timing system or laptop computer 120 and in process 258 the beam time captured and the RFID tag read and tag number are associated. This is also stored in memory 706. Next, the timing system TS 120 looks up the participant or person 104 in the database 706 based on the tag number 108 of the tag read 138 in process 260 and stores the beam tim in the record with the beam time being the baseline time as in process 262. Next process 1000 reviews to see if there are other RFID tag reads during the time when the beam was broken. If not, the process 1000 resorts back to the start. If there were other RFID tag reads during this time, the process 266 colects the RFID tag reads from the RFID Reader and in process 268 the time recorded is the base line time plus the delta time (time difference) from the previous tag read. Process 220 updates that database with the adjusted time for participant 104.

Figure 11:
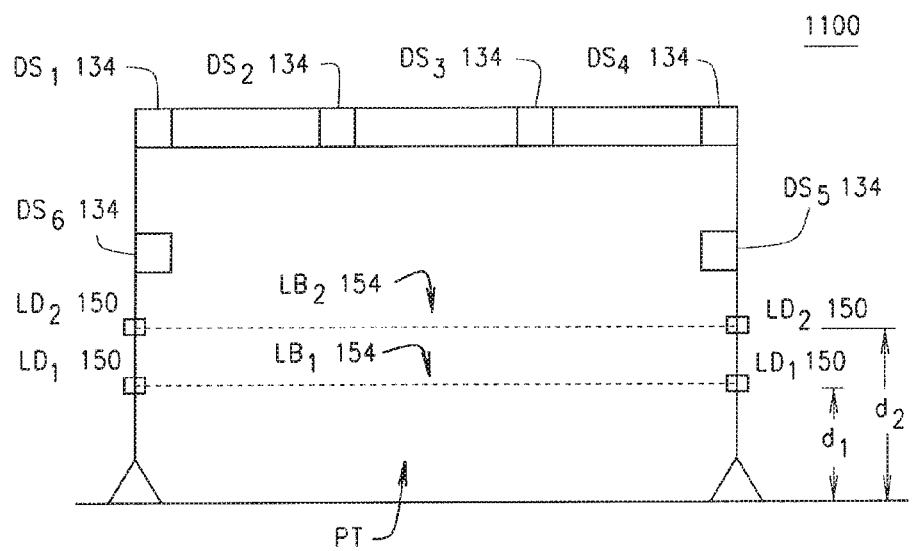
FIG. 11 is a schematic illustration of a TS system using two vertically spaced apart laser detectors tied to a single laser detection system in conjunction with an RFID tag reader for detecting the passing of detecting a plurality of participants passing a detection point in a timed racing event according to one exemplary embodiment.

FIG. 11 illustrates a TS system 100, shown here as system 1100, using two vertically spaced apart laser detectors LD1 150 and LD2 150 tied to a single laser detection system 160 (not shown) in conjunction with an RFID tag reader 130 for detecting the passing of detecting a plurality of participants 104 passing a detection point 102 in a timed racing event according to one exemplary embodiment. As shown, LD1 150 is positioned at a distance of d1 above the surface of the ground, and LD2 150 is positioned at a higher distance of d2. In this manner, accuracy of the laser detection 156 at the detection point 102 can be increased and the sensitivity of such detection 156 based on the shape of the object or the height of the leading portion of the object can be minimized.

Figure 12:
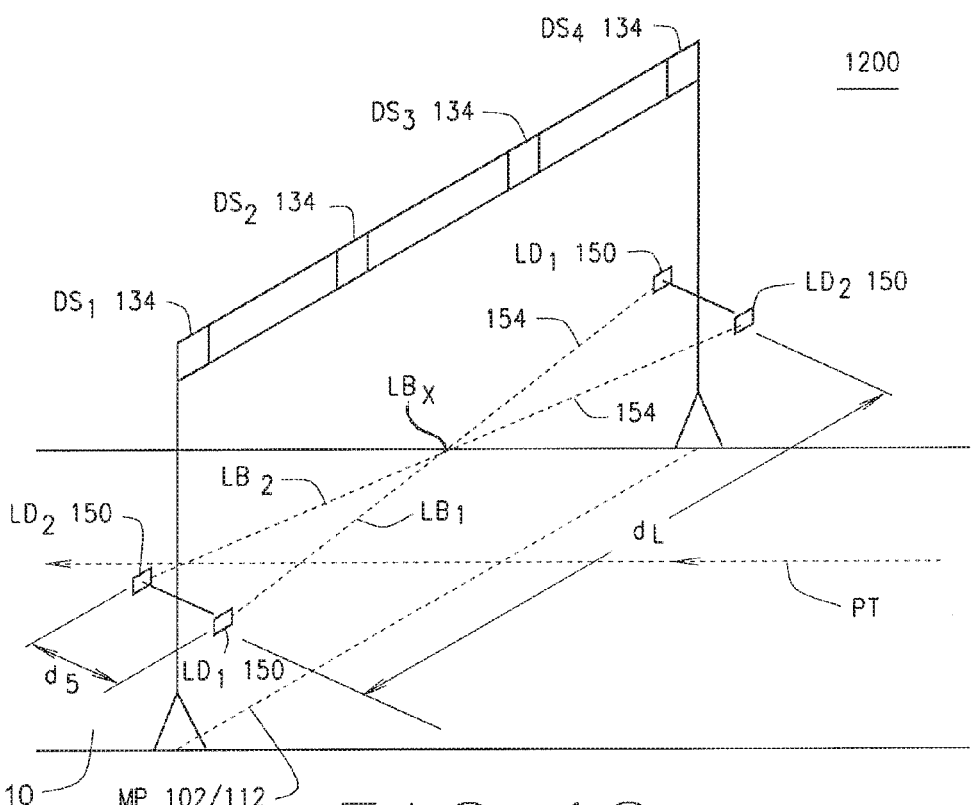
FIG. 12 is a schematic illustration of a TS system using a two horizontally spaced apart laser detectors tied to a single laser detection system wherein the two laser beams are angled across the detection line as used in conjunction with an RFID tag reader for detecting the passing of detecting a plurality of participants passing a detection point in a timed racing event according to one exemplary embodiment.
Figure 13:
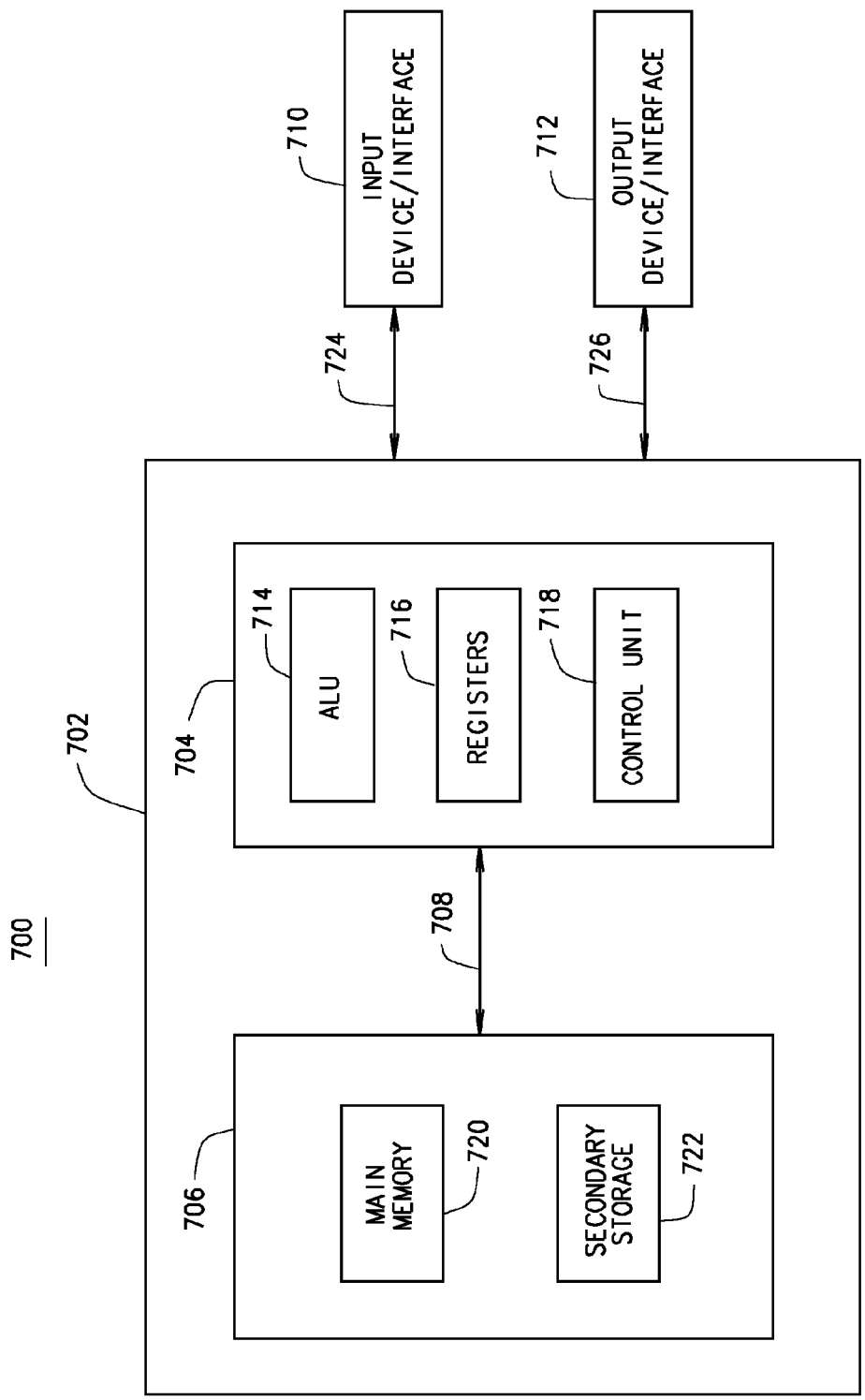
FIG. 13 is a block diagram of a specialized computer system suitable for implementing one or more assembly or methods of various embodiments as described herein.

FIG. 12 is another embodiment of a TS system 100, shown here as system 1200, using a two horizontally spaced apart laser detectors LD1 150 and LD2 150 each coupled to a single laser detection system LDS 160. In this exemplary embodiment, the two laser detectors LD1 150 and LD2 150 are spaced apart by a distance of d5 on opposing sides of the gantry on which they are mounted and therefore on opposing sides of the detection point MP 102/112. As noted the two ends of the LD1 150 and LD2 150 are spaced apart across the course R 110 at a distance of dL. The mated transmitters and receivers of each LD1 150 and LD2 150 are also on opposite sides whereby the two laser beams LB1 154 and LB2 154 are angled across the detection line 102 and cross in the middle at point $LB_X$. In this manner, LDS system 160 and TS system 120 can utilize the different time stamps for each laser beam break 156 of LB1 154 and LB2 154 in determining the timing of the crossing or passing at the detection point 102. Furthermore, such data can be utilized to determine the first PN 104 to pass the detection line 102 based on their location and the time difference between the two laser interrupts 156.

Laser Detection Point System

In some embodiments of an STS 100, as, shown in FIGS. 9-12, a detection point 102 can also include a laser detector 150 or laser detection system (LDS) 160 for detecting participant 104 or objects passing at a particular detection point 102.

A laser beam 154 can be placed at a detection line 102 to detect the passing of an object or participant 104. When the laser beam 104 is broken, a time stamped detection message 164 recording the event is sent to the STS 120. The STS 120 can coordinate the LD (laser Detection) 156 with an RFID read 138 of the RFID tag 106 or any other tag read 138 and stamp with the laser recorded time 162 to associate the two for a fine tuned time stamping of the passing at the exact detection point 102. The LDS can also be used to trigger an image capture device 202 for images 206 or for image reading of a bib tag for coordination of the detection time stamped detection at the detection point 102.

In another embodiment, the STS 100 also interfaces to our new laser system 160 so that if a chip read is missed, the image 206 can be captured and stored so that the user can identify the individual by looking at the bib number. In addition, the system 100 will automatically analyze the bib number to try and identify a participant 104 to confirm the chip read 138. If a chip read 138 is missed, this analysis will permit the system 100 to identify the participant 104.

The LDS 160 can be used to detect when a participant 104 or object crosses the LDS beam 154 that is placed at a detection point 102. When a laser detection 156 is made by the LDS 160, the STS 120 receives the detection 156 and records the time 162 that the beam was broken. This can be extremely accurate, such as to the 1,000th of a second in an STS 120. This can be done independently of any video or image capture 206 or RFID tag read 138, but such a laser detection 156 can also be integrated with one or more of them, such as a trigger for an image capture 206, or a comparison to an RFID tag read 138 and replacement of the laser detection time 162 with an associated RFID tag read 138 or in addition thereto.

The LDS 160 can be used in combination with the video system 204. When the laser beam 154 is broken 156, we can record an image 206 or we can tag the video stream 206 so that someone could look back at a given point in time and see who broke the beam 154.

The LDS can also be used to refine our read accuracy when an RFID chip is read on a single runner coming across the finish line. In some STS systems, it's difficult to have an accuracy for a chip read to a precision of less than 4 to 6 inches at the finish line. The LDS system can read the RFID chip to determine the participant, and then use the laser beam to record the actual time at the exact detection point/finish line with an accuracy down to ⅛th of an inch, which is an improvement over the current art of RFID detection.

The RFID reader (TRS) uses a digital I/O Port that is modified to receive a later beam break detection. For example, an RFID reader can have an output to the TS for receiving laser beam break detections as well are RFID chip reads. In other embodiments, the laser detection system is separate from the RFID reader and interfaces and communicates separately with the TS. Each of the RFID chip reads and the laser beam break reads are stored in the TS memory and both are associated with the RFID tag number of the participant. The TRS or TS is programmed to associate the beam break detection that is time stamped with a particular RFID tag number associated with one or more RFID chip reads. The TRS or LDS time stamps the various detections and saves the detections in their memory that is then transmitted to the timing system for determination of the time of passing of the RFID chip and therefore the participant passed the detection point, which can be a starting line, a waypoint line, or a finish line, by ways of example. As with the RFID reads, the laser read can be buffered to be sent at the next available send message processing time.

In one embodiment, a TRS or LDS can have a digital interface on it that allows connection to a LD. For example, this can include low-voltage devices that provide 5 volts or 12 volts of power to a particular connector on the TRS or LDS interface. This can include a ground screw and then N individual screws that can accommodate a positive voltage. When the LD detects a beam break, it raises the power to plus 5 volts on a connector screw on the LDS. The LDS waits for that screw post to go high with +5 volts. When it does go high, the beam break is recorded with the time of the beam break from the internal clock on the LDS that can be to the 1,000th of a second. The beam break message with the beam interrupt time is then provided to the TS, which can be, in some embodiments, a simple transmitted beam interrupt time. Based on that beam interrupt time being returned, the TS collects the RFID tag reads from the TRS. The LDS can be integrated into the TRS, or implemented on an separate USB interface board connected to a laptop, computer or the TS. The board can have digital I/O ports for interfacing with one or more LDs. In one example of such as use, for a cycling time trial with one rider at a time on the course, a LD and LDS can be set up on the start and the finish, or to capture split times on the course. The TRS can capture the RFID tag number at the beginning or any of the other detection points to verify that the cyclist is the same cyclist. Or in some embodiments, the RFID tag read can only be performed at one detection point such as the start, wherein there is only one participant being timed. It is also possible, to set up a plurality of detection points, each with a laser detector coupled to one or more laser detection systems, with each detection point spaced at intervals such as every 10 yards from the start to the finish.

The TS can keep track and store all of the time stamped messages whether beam interrupt times or RFID chip read times for each RFID tag number and therefore each participant. As such, a user or system accessing the TX can look at the log file and see the laser beam time as well as all RFID tag read times.

When there are more than one RFID tag reads but a single laser beam break, the TS analyzes the various RFID tag reads and determines the order or position of each of the RFID tags relative to each other and in relation to the detection point with the LD. In this case, the TS calculates a delta time between the determined first RFID tag and any subsequent RFID tags. The RFID tag that is determined to be the closest to the detection line, is associated with the beam interrupt time. Each subsequent RFID tag that occurs during the same beam break is provided a calculated passing time. The calculated passing time is the beam interrupt time that was associated with the determined first RFID tag, plus the determined delta time as determined from the RFID tag read differences. The first RFID tag is given the beam interrupt time and this becomes the baseline time as determined by the laser for determining the times for the RFID tags that pass the detection point during the same beam break.

The TX memory can include programming for a database in which is stored the various tag and laser interrupt times and the associated RFID tag number. In one embodiment, this can be saved in a format such as: Antenna#,Bib#,Bib#,"Time", or the like for an RFID read. For laser interrupt times, the database can store a unique number for the laser time such as with a leading or indicating value such a N or by way of example, the value of 7. Thus, an RFID tag read for a participant that has been determined by the TS to be the tag associated with the laser beam break and therefore the beam break time, would have its time adjusted to be the laser interrupt time. This might be saved in the memory for the RFID tag in the following exemplary format: 7,123,123,"08:01:30.456".

In some embodiments, the TS can use of a laser beam break to compare to a RFID determined time, so that subsequent RFID reads, that do not use the laser (such as a subsequent faulty laser) are calibrated by the difference between the laser break and that which you believed was the RFID time. In such a TS, the laser can be used at each location for calibration of the RFID read times and passing time determinations by the TS. This may be useful in situations where continuous use or detection of participants in an event cannot be detected, such as participants in a water event or course. In some embodiments, it is possible that the laser is only used to detect the first crossing of the detection point, such as the leading boat in a boat race. After that is recorded, the RFID delta times using the RFID chip reads can be used for timing of the subsequent boats.

One TS can access multiple TS files that are used within one or more of the other multiple TS systems including the Chip or TS Output File and the TS Database File. The file formats documented below are subject to change, so please check with us periodically for updates.

A TS system with a coupled participant detection system monitors a detection point and collects the identification of the detected participant and stamps a time of detection for each participant. These are referred by way of example herein as collecting participant and detection data including detection times, which can be written as participant read information to a text file. As described by way of example herein. a "chip" is a timing chip that is associated with a participant in the sporting event. A chip refers to the detection of at particular participant by a particular detection system. While a chip refers generally to an RFID chip and the reader is an RFID reader, those skilled in the art would understand that the reference to an RFID chip or chip, could be any type of tag reader or participant detection at a detection point and still be within the scope of the present disclosure.

A TS system or a user of such TS system can predetermine the name and location for the TS OUTPUT FILE. This file is updated in real-time by the TS system as the event progresses and it contains the following information: Antenna#,Bib#, Bib#,"Time" The file always uses a delimited format, shown here by example using commas as the delimiters, and the time field can be any format, but is shown in this example as having quote marks.

The exemplary format for the TS OUTPUT FILE is readable by a spreadsheet or many third party programs, but other formats are also possible. An TS system can ignore the Antenna # field for many applications as the Antenna# field is often used internally by an TS for uniquely identifying the actual equipment making the detection. The Bib # field appears twice and this is not an accident. This is repeated in this exemplary embodiment as several third-party programs require this format when importing an event timing data file. The final entry is the time of the chip read which is in the format of "HH:MM:SS" or "HH:MM:SS.XXX." As shown in this later example, the format for chip read times can be expanded to include sub-second timing. TS NET communication systems and methods should properly handle time values that may include tenths, hundreds, or thousandths of a second.

In the TS system, the chip number is generally the same as the bib number worn by the participant. Thus, for an event with perhaps 500 participants, the Bib # field may contain a value from 1 to 500. For larger racing events, the Bib # field can be up to 99999 or even up to 500000 or so depending on the requirements as the TS and TS NET systems will support these expanded field lengths.

The following is a sample of a typical TS output file over the TS NET using the HH:MM:SS format:

0,41,41,"14:27:42"
0,47,47,"14:27:44"
0,39,39,"14:27:46"
0,14,14,"14:27:48"
0,32,32,"14:27:50"

Each TS is capable of detecting and reading a single chip or participant multiple times as it approaches a timing detection point. Thus, an output file may contain multiple entries for the same chip/participant. The last entry is the final read on a chip. For example, the following output file shows that a single chip was read multiple times as the runner approached the finish line in an event.

0,32,32,"14:28:20"
0,32,32,"14:28:21"
0,32,32,"14:28:22"

In one exemplary embodiment, the output file only contains one entry since most runners can pass through the detection point in one second or less. However, if an event can have a number of walkers, there may easily be 4 to 5 entries for the same timing chip as the walker approaches and goes past the finish line.

As an TS system or detection system reads timing chips, the TS system appends new data to the file and continues to do so during the event. Thus, the file should not be modified or locked while an event or event is ongoing. Such read files can be read once the event is concluded, or while the system is not actively reading timing chips, in order to minimize any negative impact to system performance.

Each TS system coupled with a participant detection system (PDS) can have a high-speed memory with a binary database that runs in the memory and is updated very rapidly when the detection are made such as when chips are being read. When this database is saved to the disk drive, it is written to a text file using a delimited format, such as delimited using commas. When using commas as the delimiters, the file can be read by third-party programs without having to build a complex database interface as such files are common as known to those skilled in the art.

The following is a sample TS DATABASE file record:
1,Jay_Cooper,08:00:00,08:15:00,00:00:00,00:00:00,00:00:00,08:45:00,00:4500,50,Half Marathon,M,Allentown,Team Cooper,50001,Club Member,#76435,137

TS can have the ability to automatically write out the TS DATABASE FILE during an event to a file name selected by the TS user. For example, the TS can be specified to have a file written to the disk every 30, 45, or perhaps 60 seconds. In addition to writing the TS DATABASE FILE to the disk, TS can automatically create multiple files that have a unique file name that is based on the current date and time. By having multiple files on the disk, any of the files can be accessed without a concern about TS accessing those files again once they have been created. For example, an TS system can write the database to the disk every 60 seconds with a unique file name. The TS system can specify the base file name as TSDB.txt. When TS writes the file, it creates a file with the following name format:

TSDB20090501100502.txt

There can be multiple TS DATABASE FILES on the disk drive, and there could be hundreds of files by the time the event completes. Each of these files is essentially a unique snapshot of the event results for that moment in time.

The following is the format for the database file:
Bib#,Name,StartTime,Split1,Split2,Split3,Split4,FinishTime,Elaps edTime,Age,Division,Gender, City,TeamName,ChipField,UserField1,UserField2,Unique1 D.

The Bib # field can contain a value from 1 to 99999 depending on the version of the TS system in use.

The Name can contain the full name and is typically formatted as FIRST NAME LAST NAME with no comma between the first and last name, but may be formatted such as using an underscore or the like. In some embodiments, it is undesirable for particular characters, such as a comma, by way of example, not be included in the name field due to their use as a delimiter where applicable. When an TS system loads the database file, it can use particular characters such as a comma to determine the individual fields. Thus, such TS database delineation characters should not be used in the Name field as such usage can cause TS to use the wrong fields for the remaining entries on the line being read.

The following fields all contain a time based on the time of day: Start Time, Split1, Split2, Split3, Split4, and Finish Time. All of these fields are in the format HH:MM:SS or HH:MM:SS.XXX and there are no quote marks.

The described format for chip read times can be expanded to include sub-second timing. Any TS and/or TS NET implementations should be implemented to properly handle time values that may include tenths, hundreds, or thousandths of a second. Following is one exemplary embodiment of a set of applicable TS data fields:

a) The Elapsed Time field is a calculated field that is typically the Finish Time minus the Start Time. This field is in the format HH:MM:SS or HH:MM:SS.XXX and there are no quote marks.

b) The Age field can contain up to 3 digits typically ranging from 1 to 100.

c) The Division field can contain a text entry that can be up to 250 characters in length, although it is typically 20 or less characters long.

d) The Gender field can contain a text entry that can be up to 250 characters in length, although it is typically 1 character with either an M or F entry.

e) The City field can contain a text entry that can be up to 250 characters in length, although it is typically 25 or less characters long.

f) The Team Name field can contain a text entry that can be up to 250 characters in length, although it is typically 25 or less characters long.

g) The Chip field can be used, in some embodiments, to include a text entry that is associated with a particular timing chip. In some embodiments the Chip field can be up to 250 characters in length, although it is expected to be 6 or less characters long.

h) The UserField1 field can contain a text entry that can be up to 250 characters in length, although it is typically 25 or less characters long. This field may be used by the software to contain values related to team order for relay events. In some cases, the TS user can place information in this field related to the TS user's personal information such as emergency contact number.

i) The UserField2 field can contain a text entry that can be up to 250 characters in length, although it is typically 25 or less characters long. This is a second field that often contains additional personal information about an event participant.

j) The UniqueID field can contain a text entry that can be up to 250 characters in length, although it is typically 10 or less characters long. This field is often used to track event-day registration numbers or other unique values that identify an event participant. TS can automatically insert a unique value in this field during the rapid registration process in the software.

Not only can TS write this TS DATABASE FILE text file to the disk drive, it can read it back in from the TS DATABASE FILE. Thus, a TS DATABASE FILE can be created using this format and TS can read it just fine. Any time fields that are created should be in the HH:MM:SS or HH:MM:SS.XXX format with leading zeros on any times that are less than 10. For example, if the time is 9:10 am, the field should contain the entry 09:10:00 or 09:10:00:000. In most cases, when creating a new file that can be loaded into TS, the time fields should contain 00:00:00 or 00:00:00:000. However, if an event has assigned start times, the start times can be loaded into TS by using the StartTime field.

The TS can have a state-less network interface such as provided by a user data protocol (UDP) system as used for outbound and inbound messaging over a suitable communication network. The TS and TS NET systems utilize these messages to include outbound packets using TS and TS NET for READ and ANNOUNCE information, as well as other data as described herein. In addition, an TS using TS NET monitors the Internet connection for UDP TS NET messages from other TS NET systems or third-party programs coupled to the same communication network. This interface allows third-party programs to be developed which can work within the TS architecture.

UDP packets as used by the present TS NET system provide a very quick and relatively easy system to implement and from which to build flexible and robust applications. While there are known limitations for UDP packets, the describes application of the UDP packets in the TS NET recognizes these limitations and adjusts the design and applications accordingly whereby UDP provides a very suitable solution for communicating between multiple TS systems as well as sport timing auxiliary systems (TAS) in which auxiliary applications can provide vertical applications utilizing the information available within the TS NET system and methods.

The following includes the packet structure for all TS NET supported UDP packets. TS NET can be configured to listen and send on any socket ranging from 5000 to 9999. In addition, TS NET can be set to send to a specific computer by using either the computer name or its IP address. Furthermore, TS NET can send to all computers on the network by using 0.255 as the last bytes in the IP address. Of course in other systems and embodiments other broadcast messaging address can also be used and still be within the scope of the present invention. In this example, if the TS NET is set to 192.168.1.255, the TS NET sends messages as Broadcast packets. TS NET message are sent as clear text contained within the UDP packet, with fields separated by the "|" characters. |EOM| should always come at the end of each message.

As noted, the TS NET network interface is configured for stateless broadcast communications systems, such as UDP using a broadcasting IP address indicator such as 255. The networking interface can however support a variety of different types of messages. These can include broadcast messages, multicast messages and unicast messages, between and among various TS NET systems.

Broadcast TS NET messages are transmitted from the TS NET interface over the stateless broadcast communication network with no addressing as to the intended recipient as well as no identification the TS NET system that is sending or sent the message. As such, each of the Broadcast TS NET Messages can be read by any listening TS NET device, and once received by that device, the receiving TS system does not know which other TS system sent the message. As will be discussed, these include, by way of example, the ANNCM and TRSTART messages.

Multicast TS NET messages are transmitted from the TS NET interface over the stateless broadcast communication network with no addressing as to the intended recipient. However, these messages include an identification of the sending TS system, e.g., FROM identifier. These TS NET multicast messages can be read by any TS NET system and once received by that TS system, the receiving TS system knows which of the other communicating TS systems the message originated. These include, by way of example, the ANNC, ANNCL, READ, NOANNC, TSYNC, RSIG, and KREFRESH messages.

Unicast TS NET messages are transmitted from the TS NET interface over the stateless broadcast communication network with an identification of which the sending entity is (FROM identifier) as well as an identification of the intended receiving TS system (DEST or Destination identifier). These unicast TS NET messages are essentially point to point messaging within a stateless broadcast messaging communication system. Only the identified destination TS NET system should receive these messages and they are ignored by all other listening TS system. The receiving TS system knows that the message was intended for its use and it knows the identification of the sending TS. These include, by way of example, the REANNC, RESEND, LOOKUP, STARTRFID, STOPRFID, COMMAND, RQIMAGE, STIMAGE, RQIDIR, STIDIR, RQISTREAMON, and RQISTREAMOFF messages by way of example.

It should be understood to those skilled in the art that other broadcast, multicast and/or unicast messages can also be developed as an application may require or benefit from the present disclosure, and still be considered within the scope of the present disclosure.

Announce Message (ANNC): The ANNC packet is sent by TS NET to the network and can be captured by any device that is listening on the network for UDP packets. The message indicates that TS can have read a chip at the location indicated in the From field.
Packet length=variable size
Total fields=10
ANNC|FROM|BIB#|NAME|AGE|GENDER|CITY|TIME|PACKET#|EOM|
The information in this TS NET packet comes from the TS internal database. The packet # is a unique 3-digit value that begins with 1 and continues to 999, after which it wraps around and starts over at 1. This packet # can be used to ensure that all messages are received. If a message is missing, a request can be made to resent that packet. TS NET maintains a circular buffer of past messages for this purpose.

Announce Message for Lap Events (ANNCL): The ANNCL packet is sent by TS NET to the network and can be captured by any device that is listening on the network for UDP packets. The message indicates that TS can have read a chip at the location indicated in the From field.
Packet length=variable size
Total fields=11
ANNCL|FROM|BIB#|NAME|AGE|GENDER|CITY|TOTAL LAPS|TIME|TEAM NAME|PACKET#|EOM|
The information in this TS NET packet comes from the TS internal database. The packet # is a unique 3-digit value that begins with 1 and continues to 999, after which it wraps around and starts over at 1. This packet # can be used to ensure that all messages are received. If a message is missing, a resend of the packet can be requested. TS NET maintains a circular buffer of past messages for this purpose.

Re-Announce Message (REANNC): The REANNC packet can be sent by TS NET to request a re-send of a particular packet.
Packet length=variable size
Total fields=5
REANNC|FROM|DEST|PACKET#|EOM|
When this TS NET message is used, the packet number should be included as desired from the TS or TS NET buffer. The FROM and DEST fields contain the IP addresses for the two systems.

No Announce Information (NOANNC): The NOANNC packet is sent via the TS NET when a request was made for a packet that is not yet available. For example, if TS NET can only send 100 packets, and a system requests packet number 120, the system will generate the NOANNC message in response.
Packet length=variable size
Total fields=10
NOANNC|FROM|0| |0|M| |00:00:00|Packet #|EOM|
The message returns the requested packet number with the NOANNC header.

Announce Message Information (ANNCM): The ANNCM packet is sent by TS NET or the Kiosk when a new message is received by an input such as is entered by a participant or family member requesting a specific participant's data be displayed on a Kiosk or an Announcer screen.
Packet length=variable size
Total fields=4
ANNCM|BIB #|MESSAGE|EOM|

Read Message (READ): The READ packet is sent by TS NET to the network and can be captured by any device that is listening on the network for UDP packets. The packet is a real-time feed of any reads that are occurring at the particular TS timing system.
Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB#.

Resend Message (RESEND): The RESEND message is sent to any TS system requesting that it re-send a past message. If a message is lost over the network, a request to resend can be made for any of the last 999 messages sent previously. TS NET maintains a buffer with the past 999 messages. Once the 999 position is used, TS NET starts over at position 1. Thus, TS NET is maintaining a circular buffer of messages.
Packet length=variable size
Total fields=5
RESEND|FROM|DEST|PACKET #|EOM|

The Destination field is the TS system that should respond to this request. This is the same name set in the TS Defaults for "My Name" in the networking section. If a request is made for a packet number that has not yet been used by TS NET, a packet response starting with the BLANK field can be received.

Time Sync Message (TSYNC): The TSYNC message is sent using TS NET to any TS system that is listening for Time Sync commands. This is typically used by TS Remote to make sure the time on the Remote laptop is the same as that on the TS system. There can always be a slight delay in the network transmission, and as such a 0.25 to 0.5 second delay may be added to the time received using TS NET to compensate for the delay.
Packet length=variable size
Total fields=4
TSYNC|FROM|TIME|EOM|

The FROM field is the name set in the TS Defaults as My Name.

Time Sync Message (TRSTART): The TRSTART message is sent using TS NET to the Kiosk to set the start clock for the event. The start time can be set on a Kiosk using a command in the Configuration screen. However, by sending this packet to the Kiosk, the time can be set remotely from a TS system.
Packet length=variable size
Total fields=4
TSYNC|TIME|EOM|

Remote Signal Message (RSIG): The RSIG message is sent using TS NET to any system that is listening for RSIG command. This is typically used by TS Remote to make sure the connection over the network is good to TS NET and also to verify that TS NET is scanning and listening for remote entries.
Packet length=variable size
Total fields=4
RSIG|FROM|TIME|EOM|

The FROM field is the name set in the TS Defaults as My Name.

Refresh KIOSK Message (KREFRESH): The KREFRESH message is sent using TS NET to any system (typically a Kiosk) that is listening for the KREFRESH command. This is typically used by TS NET to send out all of the results in an event to the Kiosk. This might be useful if the Kiosk re-booted or if the Kiosk was started after results had already occurred in an event
Packet length=variable size
Total fields=10
KREFRESH|FROM|BIB#|NAME|AGE|GENDER |CITY|TIME|PACKET#|EOM|

The information in this TS NET packet comes from the TS internal database. The packet # is a unique 3-digit value that begins with 1 and continues to 999, after which it wraps around and starts over at 1. This packet # can be used to ensure that all messages are received. If a message is missing, a request that packet be re-sent can be made. TS NET maintains a circular buffer of past messages for this purpose.

Lookup Message (LOOKUP): The LOOKUP message allows a device to request event information from another device. The identifier may be any text. In most cases, the identifier will be a tag serial number, event bib number, participant name, or perhaps a unique identifier that refers to a particular type of information. For example, if a TS systems needs to know the current duration of an event, the LOOKUP message could be sent to a TS system that is responsible for tracking the total event time. The identifier field might contain the text entry "EVENTTIME" and this entry could be used to indicate that the event duration is desired. The packet number field is optional and if not used, the field could contain a single space.
Packet length=variable size
Total fields=6
LOOKUP|FROM|DEST|IDENTIFIER|PACKET #|EOM|

Start RFID Message (StartRFID): The StartRFID message can be sent to a TS system to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use. Other systems could include: laser detection, video detection, etc. As such, this message could alternatively be: StartDETECTOR, or StartLASER, or StartVIDEO. by ways of examples.
Packet length=variable size
Total fields=7
StartRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Stop RFID Message (StopRFID): The StopRFID message can be sent to a device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc.

As such, this message could alternatively be: StopDETECTOR, or StopLASER, or StopVIDEO. by ways of examples.
Packet length=variable size
Total fields=7
StopRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Command Message (COMMAND): The COMMAND message can be sent to a TS system to request that a particular command be executed in that TS system. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST|IDENTIFIER|PACKET #|EOM|

Request Image Message (RQIMAGE): The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a remote system where a file is located. The DATAFORMAT field may be used to specify the format of the image to be sent, the type of encryption used if any, and/or the type or amount of compaction. If higher performance across a network is desired, this field might be used to indicate that High compression is desired or that 8-bit compression or compaction has been added. If security is required, this could include encrypted with 128-bit encryption format. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKETSIZE|PSOCKET|PACKET #|EOM|

Image Sent Message (STIMAGE): The STIMAGE message is sent from a system responding to a request for an image, e.g., RQIMAGE. The IDENTIFIER field should contain the unique descriptor for the image that was requested and may contain any text desired. Typically, this field will contain a unique number for a participant in an event. However, the IDENTIFIER could also contain a specific location on a given system where a file is located. The DATAFORMAT field indicates the type of compression, encryption or compaction used on the image or images when it was sent, as discussed above. The PACKETSIZE field should contain a value indicating the length of the portion of the image just sent. Given that most images will contain more data than is able to be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|DATAFORMAT|PACKETSIZE|PSOCKET|PACKET #|EOM|

The DATAFORMAT message maybe something like:
COMX2:ENC128:8 BIT, by way of example.

Request Image Library Contents Message (RQIDIR): The RQIDIR message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format. Of course other qualifiers may be used for other formats.

Packet length=variable size
Total fields=6
RQIDIR|FROM|DEST|IDENTIFIER|PACKET #|EOM|

Image Library Sent Message (STIDIR): The STIDIR message can be sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.

Packet length=variable size
Total fields=6
STIDIR|FROM|DEST|FILELIST|PACKET #|EOM|

Request Image Stream On Message (RQISTREAMON): The RQIDTREAMON message is by a TS system to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The DATAFORMAT field may be used to specify the format to be used when sending the video stream, such as the type of encoding, compression, encryption or compaction used on the video stream as discussed above related to the images. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.

Packet length=variable size
Total fields=10
RQISTREAMON|FROM|DEST|IDENTIFIER|DATA FORMAT|PACKETSIZE|PSOCKET|TIMEOUT|PACKET #|EOM|

Request Image Stream Off Message (RQISTREAMOFF): The RQISTREAMOFF message is sent by a TS system to request that a particular image stream be disabled. The IDENTIFIER field should contain a unique descriptor for the stream to be disabled. The PSOCKET field can also be used to identify a particular socket, in the event that multiple streams are being sent at the same time.

Packet length=variable size
Total fields=7
RQISTREAMOFF|FROM|DEST|IDENTIFIER |PSOCKET|PACK ET #|EOM|

LASER Beam Break Message (LASBMBRK): The LASBMBRK message is sent to a chip or remote system to let it know that a laser beam has been broken at a particular location or laser monitored point MPL. The LSOCKET value can be used to identify a unique socket on the TRS or laser detection system (LDS). The IDENTIFIER can be used to designate a location or identification of the particular LDS. Typically, this value might be a number from 1 to 255. The TIME field will contain a time value indicating when the laser beam break occurred. The BUFFER may contain any other data may be programmed to store and send.

Packet length=variable size
Total fields=8
LASBMBRK|FROM|DEST|LSOCKET|IDENTIFIER| TIME|BUFFER|EOM|

LASER Beam On Message (LASBMON): The LASBMON message is sent to a chip or remote system to let it know that a laser beam should be enabled. The LSOCKET value can be used to identify a unique socket on the TRS or laser detection system (LDS). The IDENTIFIER can be used to designate a location or identification of the particular LDS. Typically, this value might be a number from 1 to 255. The TIME field is optional and could contain a time value indicating when you wish the laser beam to enable itself. If this field is blank, the laser will immediately turn itself on. The BUFFER may contain any other data may be programmed to store and send.

Packet length=variable size
Total fields=8
LASBMON|FROM|DEST|LSOCKET|IDENTIFIER| TIME|BUFFER|EOM|

LASER Beam Off Message (LASBMOFF): The LASBMOFF message is sent to a chip or remote system to let it know that a laser beam should be turned off. The LSOCKET value can be used to identify a unique socket on the TRS or laser detection system (LDS). The IDENTIFIER can be used to designate a location or identification of the particular LDS. Typically, this value might be a number from 1 to 255. The TIME field is optional and could contain a time value indicating when you wish the laser beam to disable itself. If this field is blank, the laser will immediately turn itself off. The BUFFER may contain any other data you wish to send.

Packet length=variable size
Total fields=8
LASBMOFF|FROM|DEST|LSOCKET|IDENTIFIER| TIME|BUFFER|EOM|

LASER Beam Request Message (LASBMREQ): The LASBMREQ message is sent to a chip or remote system to request a particular function be executed. The function could include any number of parameters such as configuring the time necessary to trigger a Beam Break. Another use might be to request a history of all beam breaks during the past 24 hours. The LSOCKET value can be used to identify a unique socket on the TRS or laser detection system (LDS). The IDENTIFIER can be used to designate a location or identification of the particular LDS. Typically, this value might be a number from 1 to 255. The BUFFER may contain any other data may be programmed to store and send.

Packet length=variable size
Total fields=7
LASBMREQ|FROM|DEST|LSOCKET|IDENTIFIER| BUFFER|EOM|

In other embodiments, the packet formats can vary from that described above and herein and still be within the scope of the present disclosure. For example, some or all of the timing system database fields can be sent when most of the packets are sent. In such embodiments, this can allow applications to have all of the data contained in a record in the database.

Operating Environment

Referring to FIG. 11, an operating environment for an illustrated embodiment of the an RFID semiconductor chip and/or remote transceiver is a computer system 700 with a computer 702 that comprises at least one high speed processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface.

The illustrated CPU 704 for an RFID semiconductor chip is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. The illustrated embodiment of the invention operates on an operating system designed to be portable to any of these processing platforms.

The memory system 706 generally includes high-speed main memory 720 in the form of a medium such as random access memory (RAM) and read only memory (ROM) semiconductor devices that are typical on an RFID semiconductor chip. However, the present disclosure is not limited thereto and can include secondary storage 722 in the form of long-term storage mediums such as floppy disks, hard disks, tape, CD-ROM, flash memory, etc. and other devices that store data using electrical, magnetic, and optical or other recording media. The main memory 720 also can include, in some embodiments, a video display memory for displaying images through a display device (not shown). Those skilled in the art will recognize that the memory system 706 can comprise a variety of alternative components having a variety of storage capacities.

Where applicable, while not typically provided on RFID tags or chips, an input device 710, and output device 712 can also be provided. The input device 710 can comprise any keyboard, mouse, physical transducer (e.g. a microphone), and can be interconnected to the computer 702 via an input interface 724 associated with the above described communication interface including the antenna interface. The output device 712 can include a display, a printer, a transducer (e.g. a speaker), and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software that controls the computer system's operation and the allocation of resources. The application program is the set of software that performs a task desired by the user, using computer resources made available through the operating system. Both are typically resident in the illustrated memory system 706 that may be resident on the RFID semiconductor chip.

In accordance with the practices of persons skilled in the art of computer programming, the present invention is described below with reference to symbolic representations of operations that are performed by the computer system 700. Such operations are sometimes referred to as being computer-executed. It will be appreciated that the operations that are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 706. When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system for determining a time of a passing a detection line on a route by two participants each having an RFID tag on the participant or an object associated with each participant, both of which are traveling along the route, the system comprising:

a timing system having a processor, a memory, a clock, and a data interface;

a RFID tag reader system having a processor, a memory, a clock, a communication interface for communicating with the timing system, a radio frequency transceiver for wirelessly communicating with the RFID tag, and one or more antenna coupled to the radio frequency transceiver positionable proximate to the detection line for communicating with the RFID tags at one or more monitored points passed by each participant as they approach the detection line, the tag reader system transmitting a tag read request and receiving one or more tag reads including a different tag identifier for each of the RFID tags when the two RFID tags are proximate to one of the monitored points, time stamping each of the RFID tag reads, and transmitting over the communication interface to the timing system a tag read message including the tag identifier and at least a portion of the time stamped RFID tag reads for each of the two RFID tags;

a laser detector having a laser beam generator for projecting a laser beam across the detection line, the laser detection system generating a laser beam interrupt indicator when detecting an interruption of the projected laser beam at the detection line;

a laser detection system having a processor, a memory, a clock, a communication interface for communicating with the timing system and an interface coupled to the laser detector for receiving the generated laser beam interrupt indicator, the laser detection system determining a beam interrupt time of when the laser beam was interrupted as provided by the laser beam interrupt indicator, and creating a laser beam interrupt message including the beam interrupt time, and transmitting over the communication interface to the timing system the laser beam interrupt message;

wherein the timing system receives the tag read messages from the RFID tag reader system and the laser beam interrupt message, determines from the RFID tag reads which one of the received RFID tags is the first RFID tag and which is the second RFID tag, the first RFID tag being determined as the one having the shortest distance between the RFID tag and the detection line, the timing system associating the beam interrupt time with the first RFID tag, the timing system determining a delta time as the difference between the time stamps of the first and second RFID tag reads, the timing system determining a second beam interrupt time for the second RFID tag as the sum of the first beam interrupt time and the delta time, and storing in the timing system memory the beam interrupt time of the laser beam interrupt message as the time of detecting the passing at the detection line of the first RFID tag and the associated first tag identifier and storing the determined second beam interrupt time in the timing system memory as the time of detecting the passing at the detection line of the second RFID tag and associated second tag identifier.

2. The system of claim 1 wherein the RFID tag reader system includes a digital I/O port configured to receive the laser beam interrupt indicator and wherein the RFID tag reader system includes the laser detection system.

3. The system of claim 2 wherein the RFID tag reader system is configured to interface with a plurality of laser detectors.

4. The system of claim 1 wherein the timing system stores each of the received time stamped RFID tag reads and the beam interrupt time in the timing system memory in a file associated with each determined tag identifier.

5. The system of claim 4 wherein the stored beam interrupt time and RFID tag read times are stored in the timing system memory so that they are uniquely identified as to their origin.

6. The system of claim 1 wherein the system includes a plurality of laser detectors, each coupled to the laser detection system and each positioned at the same detection line.

7. The system of claim 6 wherein at least two of the laser detectors are positioned at different heights.

8. The system of claim 1 wherein the system includes two laser detectors each positioned at about the same height but spaced apart from each other on opposing sides but proximate to the detection line.

31

9. The system of claim 8 wherein the two laser detectors are positioned so that their projected laser beams are angled relative to the detection line, and wherein each generates a separate beam interrupt indicator and the laser detection system determines a separate beam interrupt time, calculating a time of passing of the participant based on a comparison of the two separate beam interrupt times.

10. The system of claim 1 wherein the timing system is configured for controlling the laser detection system and the laser detection system is configured to receive controls from the timing system and to control the coupled laser detector, said controlling including the activating and deactivating of the laser beam generator, and the receipt and request of a laser beam interrupt message.

11. The system of claim 1 wherein the laser detector generator projects a dual beam laser beam.

12. A method of determining a time of a passing a detection line on a route by two participants each having an RFID tag on the participant or an object associated with each participant, both of which are traveling along the route, the method comprising:
  a) in a RFID tag reader system having a processor, a memory, a clock, a communication interface for communicating with a timing system, a radio frequency transceiver for wirelessly communicating with the RFID tag, and one or more antenna coupled to the radio frequency transceiver that are positioned proximate to the detection line for communicating with the RFID tags at one or more monitored points passed by each participant as they approach the detection line:
    transmitting a tag read request and receiving one or more tag reads including a different tag identifier for each of the RFID tags when the two RFID tags are proximate to one of the monitored points;
    time stamping each of the RFID tag reads; and
    transmitting over the communication interface to the timing system a tag read message including the tag identifier and at least a portion of the time stamped RFID tag reads for each of the two RFID tags;
  b) in a laser detector having a laser beam generator:
    projecting a laser beam across the detection line;
    generating a laser beam interrupt indicator when detecting an interruption of the projected laser beam at the detection line;
  c) in a laser detection system having a processor, a memory, a clock, a communication interface for communicating with the timing system and an interface coupled to the laser detector;
    receiving the generated laser beam interrupt indicator;
    determining a beam interrupt time of when the laser beam was interrupted as provided by the laser beam interrupt indicator; and
    creating a laser beam interrupt message including the beam interrupt time, and transmitting over the communication interface to the timing system the laser beam interrupt message;
  d) in a timing system having a processor, a memory, a clock, and a data interface;
    receiving the tag read messages from the RFID tag reader system;
    receiving the laser beam interrupt message;
    determining from the RFID tag reads which one of the received RFID tags is the first RFID tag and which is the second RFID tag, the first RFID tag being determined as the one having the shortest distance between the RFID tag and the detection line;

32 associating the beam interrupt time with the first RFID tag;
    determining a delta time as the difference between the time stamps of the first and second RFID tag reads;
    determining a second beam interrupt time for the second RFID tag as the sum of the first beam interrupt time and the delta time;
    storing in the timing system memory the beam interrupt time of the laser beam interrupt message as the time of detecting the passing at the detection line of the first RFID tag and the associated first tag identifier; and
    storing the determined second beam interrupt time in the timing system memory as the time of detecting the passing at the detection line of the second RFID tag and associated second tag identifier.

13. The method of claim 12, further comprising,
  in the timing system
  storing each of the received time stamped RFID tag reads and the beam interrupt time in the timing system memory in a file associated with each determined tag identifier.

14. The method of claim 13 wherein storing the beam interrupt time and each of the RFID tag read times are stored in the timing system memory so that they are uniquely identified as to their origin.

15. The method of claim 12 wherein the laser detector is a first laser detector having a first laser beam generator and the projecting is projecting a first laser beam across the detection line and generating a first laser beam interrupt indicator when detecting the interruption of the projected first laser beam at the detection line,
  further comprising
    in a second laser detector having a second laser beam generator,
    projecting a second laser beam across the detection line but spaced apart from the first laser beam and generating a second laser beam interrupt indicator when detecting an interruption of the projected second laser beam at the detection line,
    and wherein in the laser detection system, determining a second beam interrupt time, and creating a second laser beam interrupt message including the second beam interrupt time, and transmitting over the communication interface to the timing system the second laser beam interrupt message,
  wherein the timing system receives the second laser beam interrupt message and calculating a time of passing of the participant based on a comparison of the first beam interrupt time to the second beam interrupt time.

16. The method of claim 15 wherein the first laser detector generates the first laser beam at a first height at the detection line and the second laser detector generates the second laser beam at a second height at the detection line that is different than the first height.

17. The method of claim 15 wherein the first laser detector generates the first laser beam at a first height at the detection line and the second laser detector generates the second laser beam at a second height at the detection line that is about the same height as the first height but spaced apart from the first laser beam on an opposing side proximate to the detection line.

18. The system of claim 15 wherein the two laser detectors are positioned so that the first laser beam and the second laser beam are each positioned at an angle relative to the detection line.

19. The method of claim 12 wherein in the timing system controlling the laser detection system and in the laser detection system receiving controls from the timing system and controlling the coupled laser detector responsive thereto, said controlling including the activating and deactivating of the laser beam generator, and controlling the receipt and request of a laser beam interrupt message.

20. The method of claim 12 wherein in the laser detector projecting includes projecting a dual beam laser beam across the detection line.

* * * * *